Aug. 21, 1956  L. D. STATHAM  2,760,037
ELECTRICAL STRAIN WIRE TRANSDUCER
Filed April 20, 1955  13 Sheets-Sheet 1
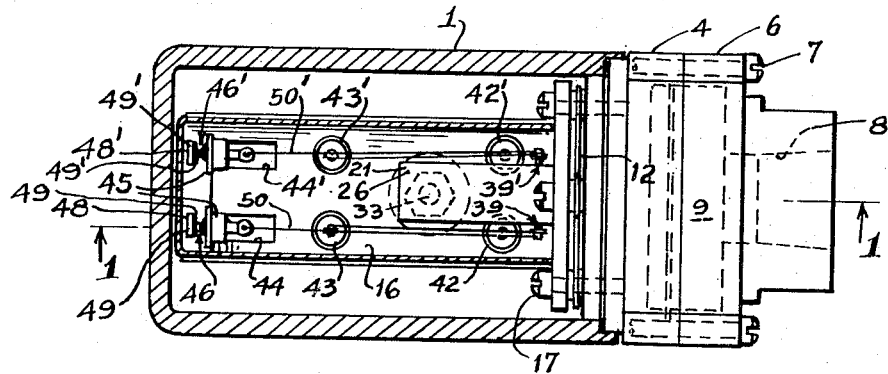
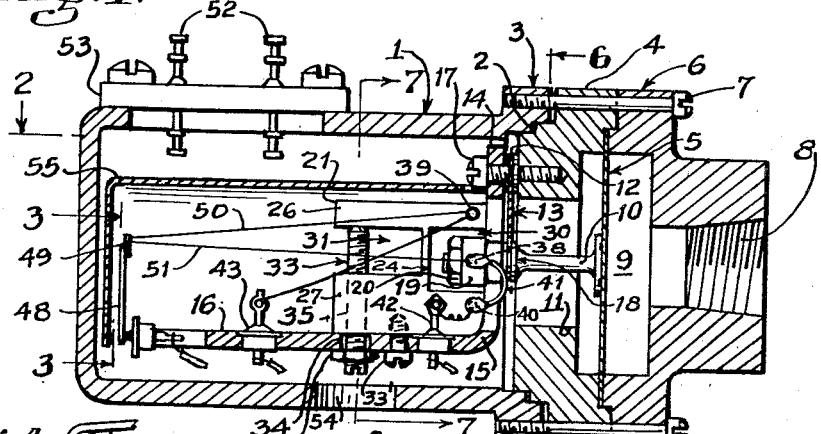
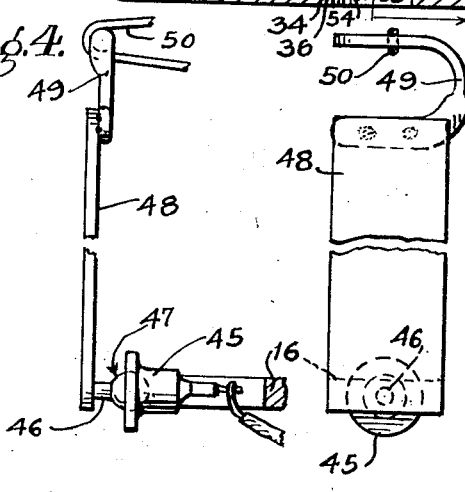
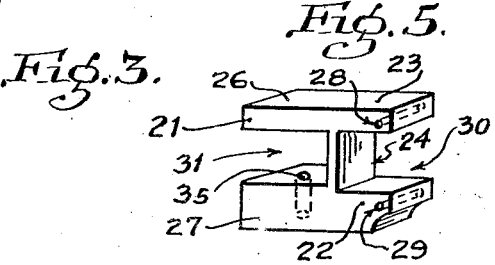
INVENTOR
LOUIS D. STATHAM
BY Philip Subkow
ATTORNEY Aug. 21, 1956 L. D. STATHAM 2,760,037
ELECTRICAL STRAIN WIRE TRANSDUCER
Filed April 20, 1955 13 Sheets-Sheet 2

INVENTOR
Louis D. Statham
BY Philip Subkow
ATTORNEY.

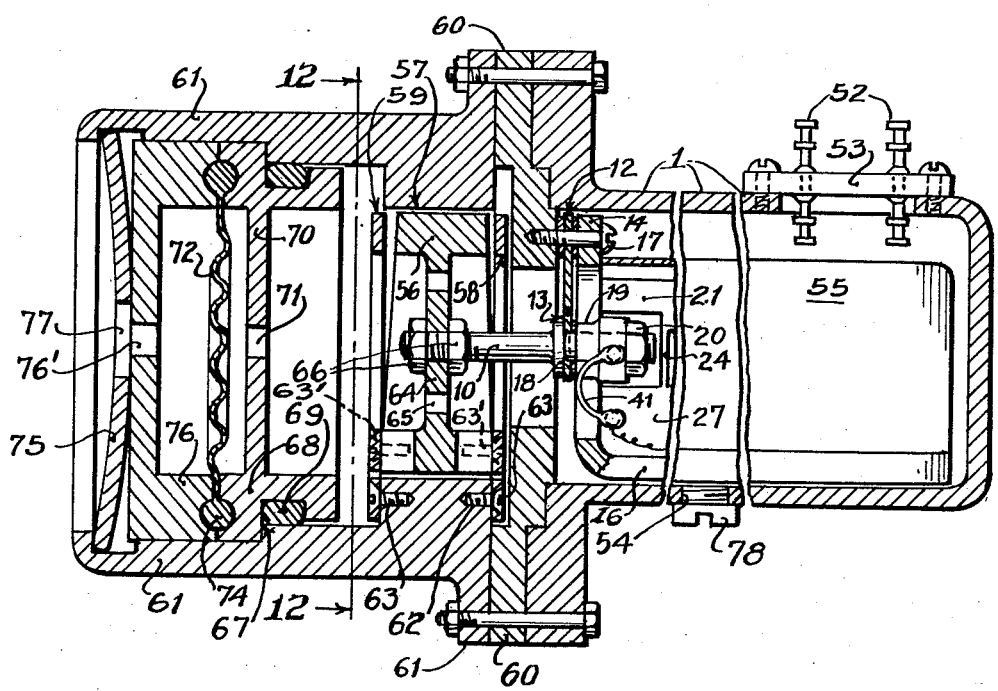
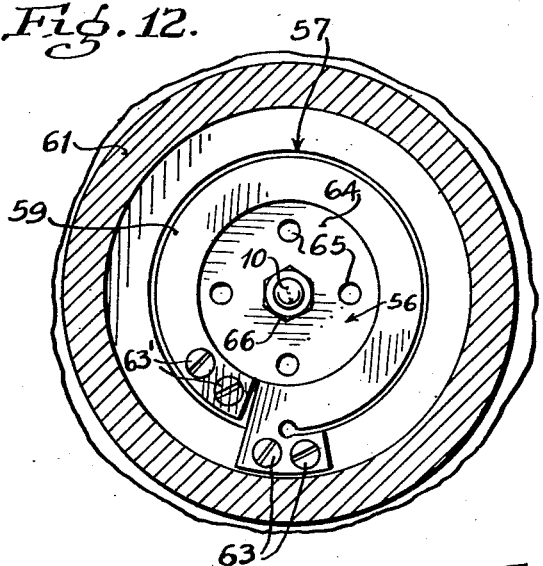

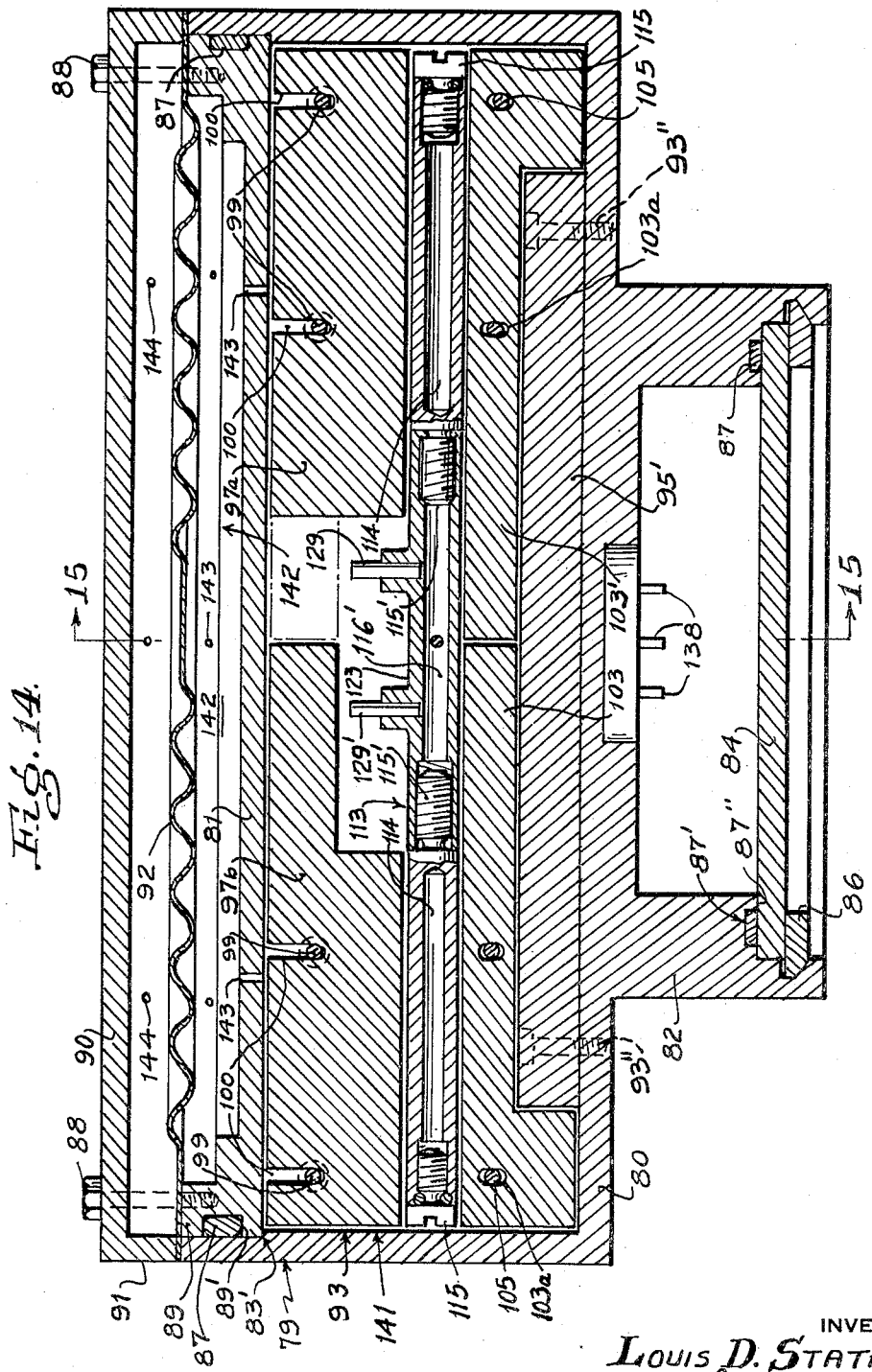

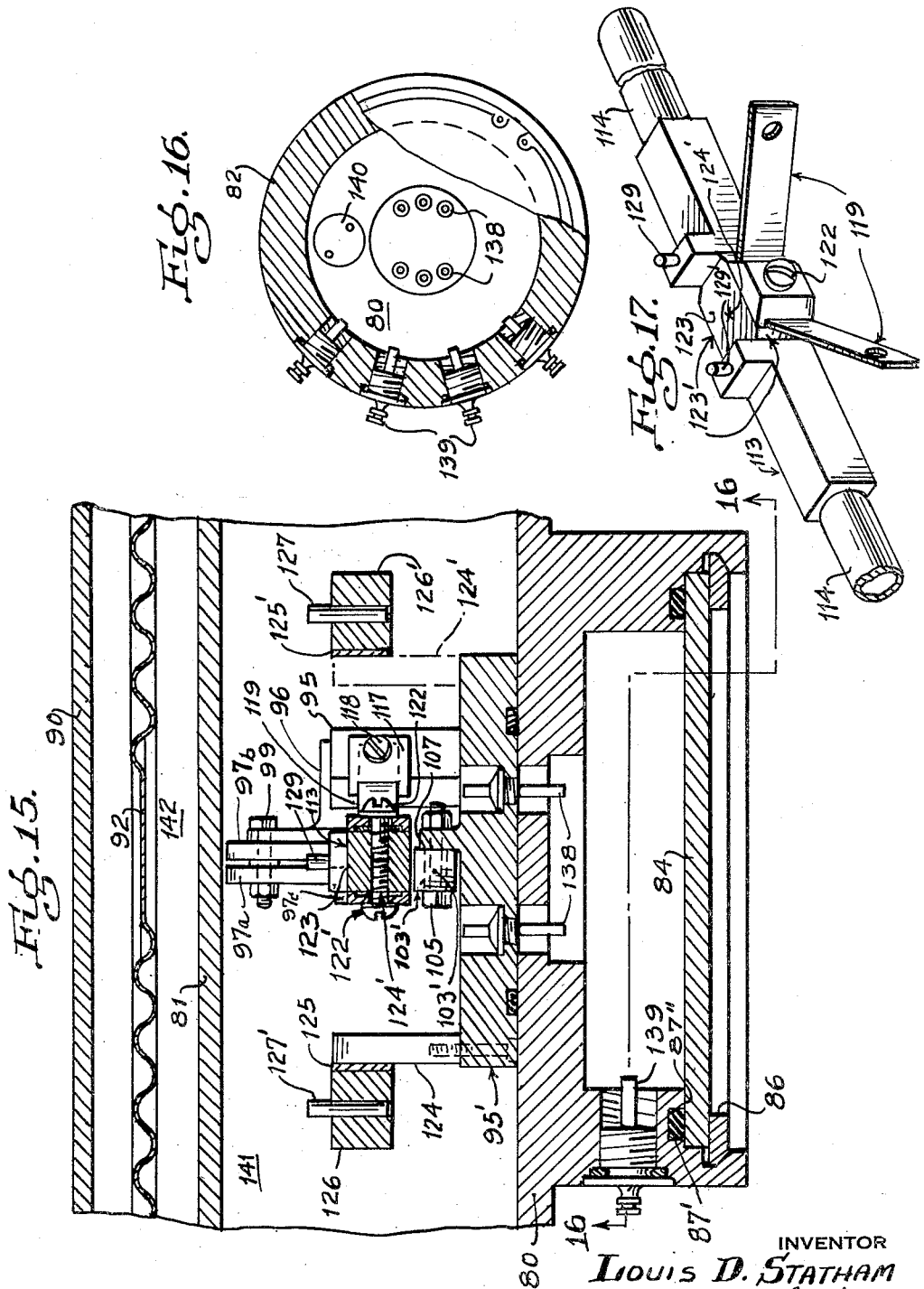

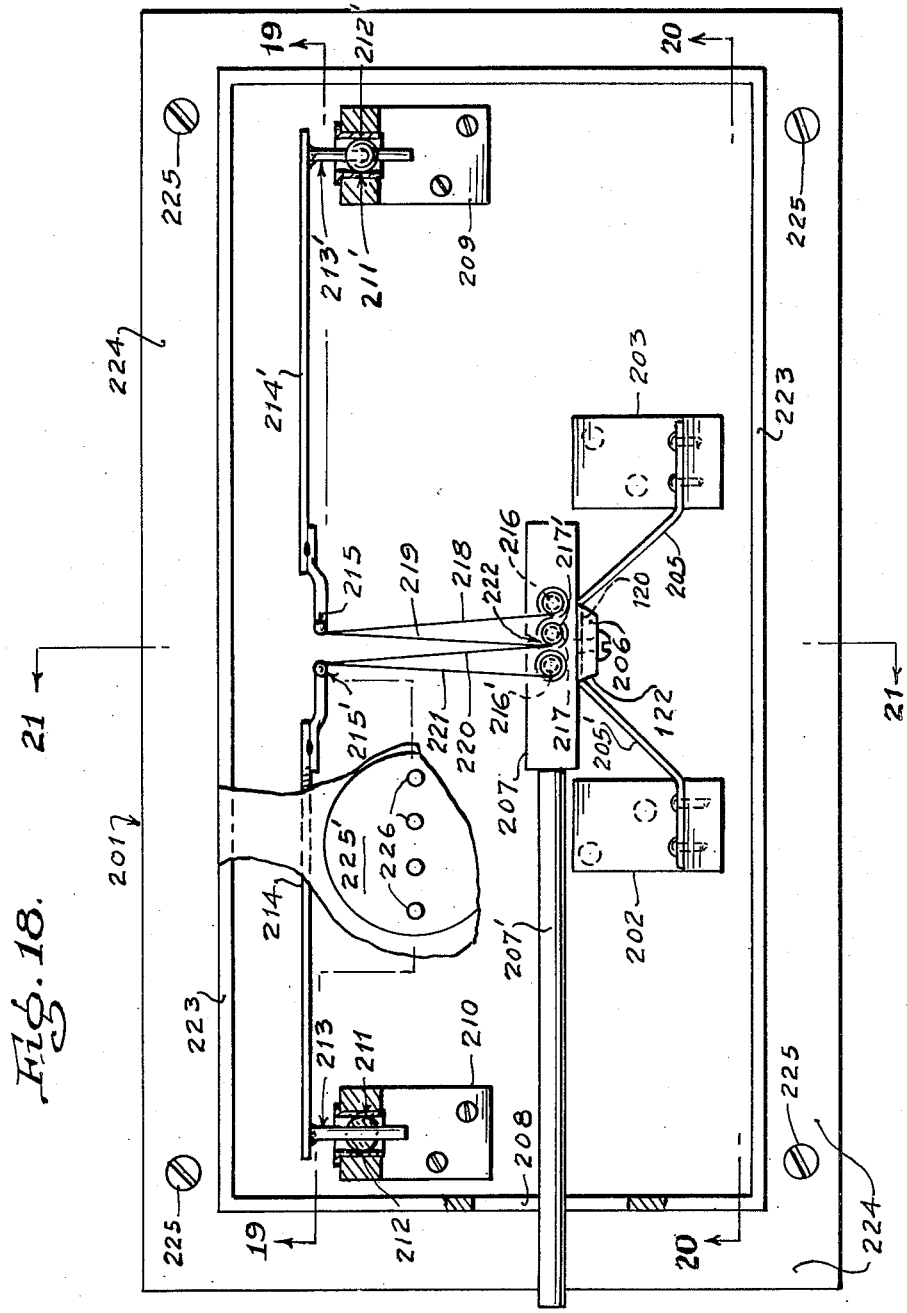

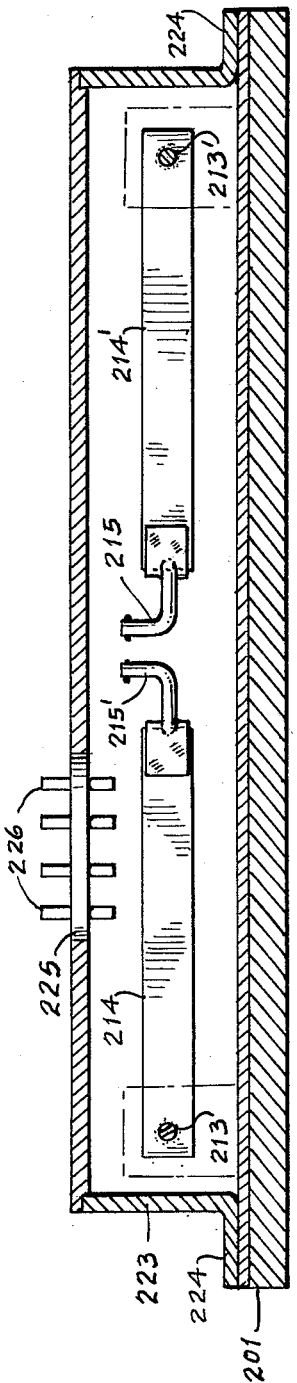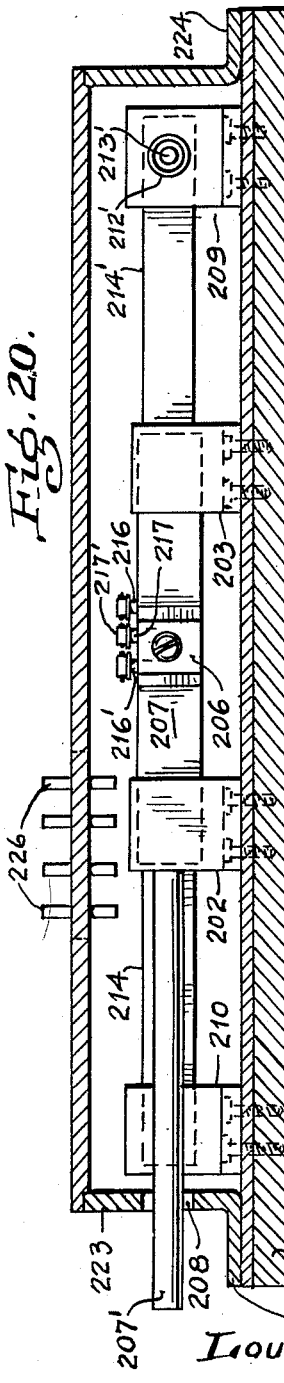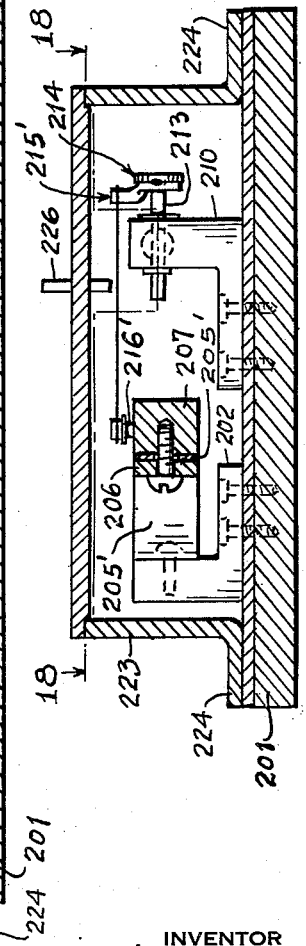

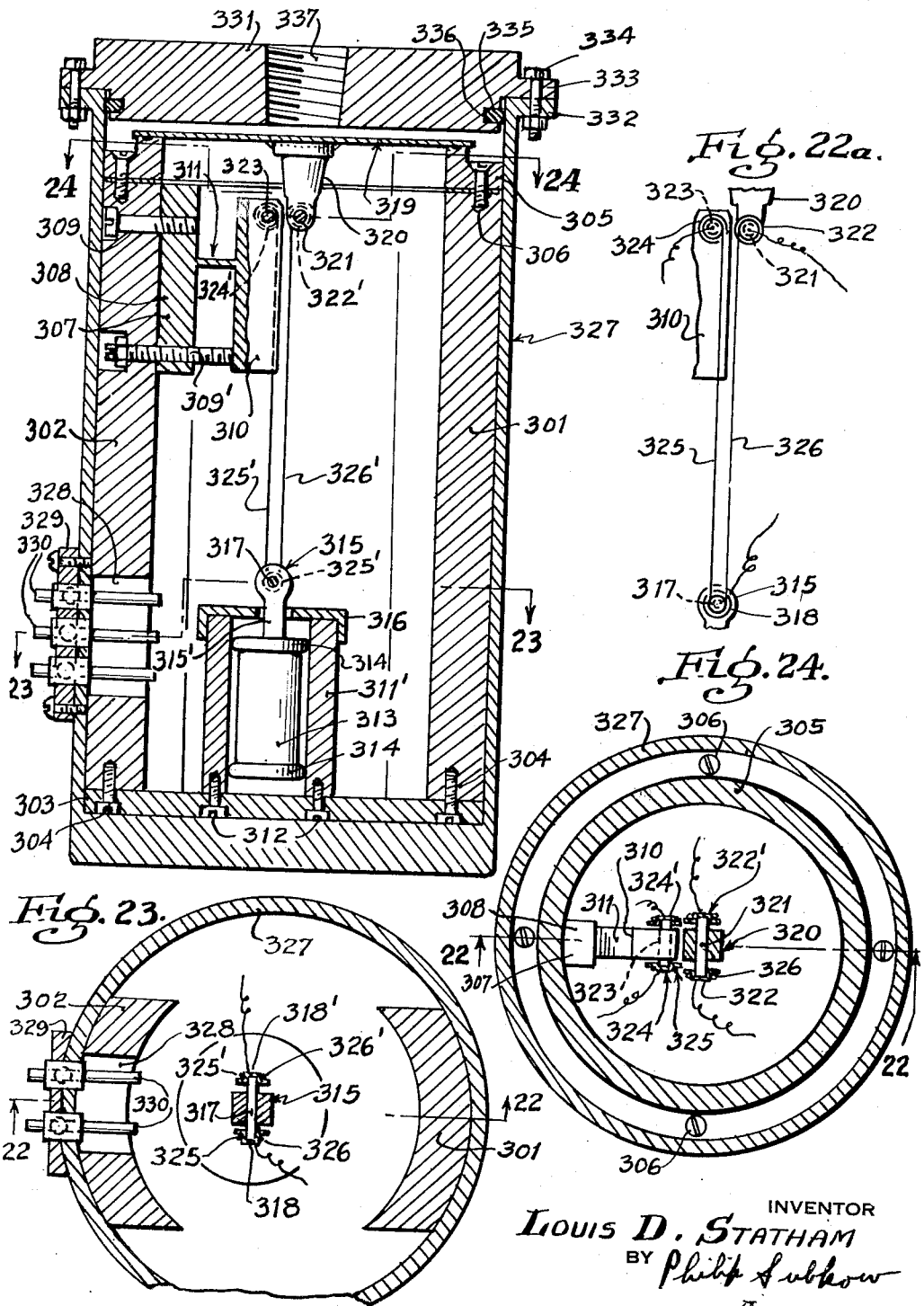

Aug. 21, 1956　　　　　　L. D. STATHAM　　　　　　2,760,037
ELECTRICAL STRAIN WIRE TRANSDUCER
Filed April 20, 1955　　　　　　　　　　　　　　13 Sheets-Sheet 10
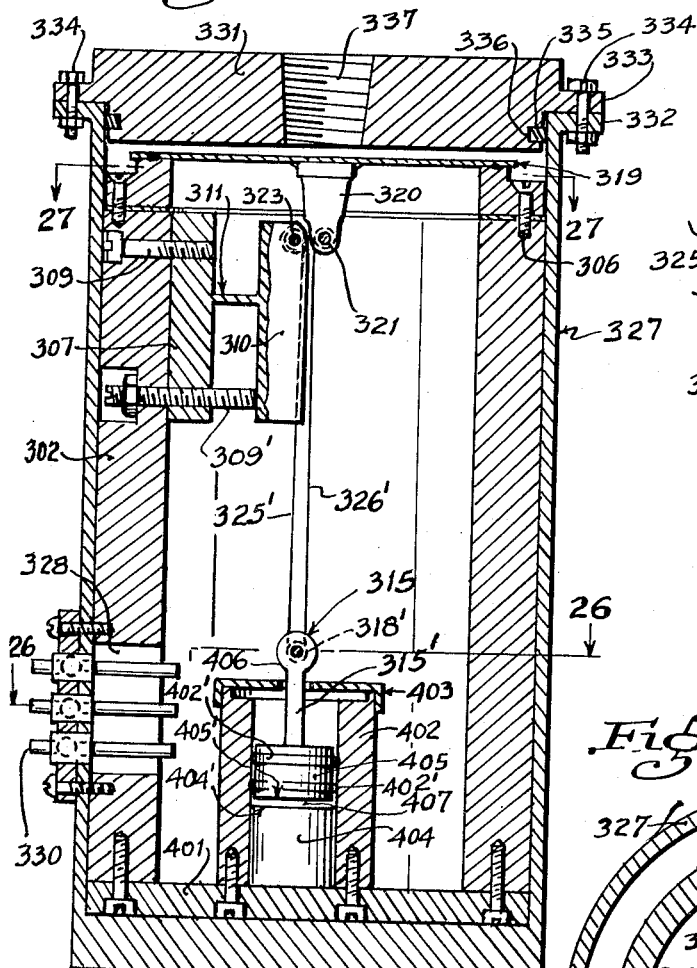
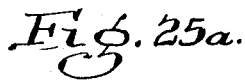
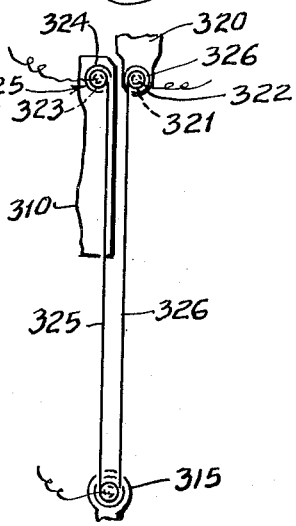
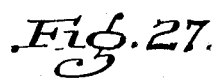
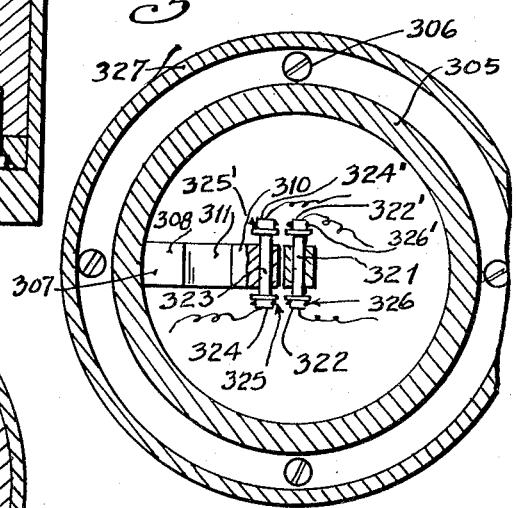
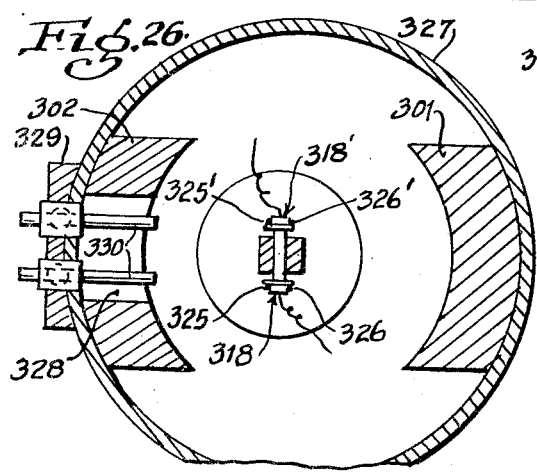
INVENTOR
*Louis D. Statham*
BY *Philip Subkow*
ATTORNEY.

Fig. 31.
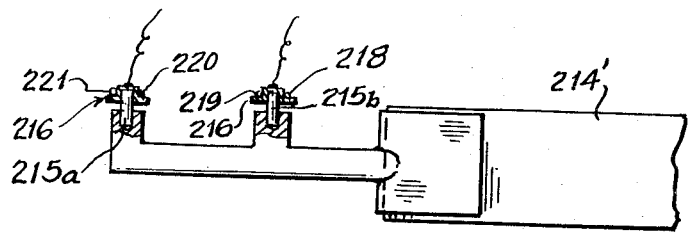
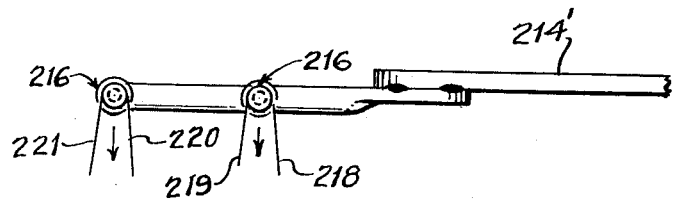
Fig. 32.

Aug. 21, 1956 L. D. STATHAM 2,760,037
ELECTRICAL STRAIN WIRE TRANSDUCER
Filed April 20, 1955 13 Sheets-Sheet 13

INVENTOR
LOUIS D. STATHAM
BY
ATTORNEY.

United States Patent Office 2,760,037
Patented Aug. 21, 1956

2,760,037

ELECTRICAL STRAIN WIRE TRANSDUCER

Louis D. Statham, Beverly Hills, Calif., assignor to Statham Laboratories, Inc., Los Angeles, Calif., a corporation of California Application April 20, 1955, Serial No. 502,663

37 Claims. (Cl. 201—63)

This invention relates to an electrical strain wire transducer. Transducers in which a force summing means varies the tensile stress on the wire to cause a variation in the electrical resistance of the wire which is thus a measure of the motion of or of a force improsed on a force summing means are well known. The force summing means may be a rod, diaphragm, or weight, or any other member subject to motion in space as a result of forces or motions imposed thereon. The force summing means is the medium for summing up all the forces simultaneously applied to the force summing means and transmitting the same to the wire. When the force summing means is a rod, the transducer may be a displacement measuring device; or, where the force summing means is a diaphragm, the transducer may be a pressure gauge; and, where the force summing means is a weight, it may be a velometer, accelerometer, or velocitometer, as the case may be. The foregoing is intended as illustrative and not as exhaustive of the forms of force summing means and of the applications of strain wire transducers.

Such strain wire gauges are of two general types. In one of the types, the wires are connected by one end to a fixed point, and the other end of the wire to the force summing means. In another type, wire supports are subject to motion with respect to each other, and none of the wire supports are connected to a fixed point.

In both of these forms, the nature of the winding configuration in the strain wire transducer determines whether the electrical circuit, in which the wires are connected for purpose of detecting or measuring their variation in electrical resistance, contains filaments which vary in tension all in one direction, or whether this winding includes wires whose tensions vary in opposite directions upon a displacement of the force summing means, when the electrical circuit is in the form of a bridge, as is usual. The electrical output of the bridge, i. e., the total variation in resistance and, therefore, the voltage output per unit of voltage input to this bridge is twice as great in the second instance as in the first instance. The second type of winding is preferred.

In the conventional strain wire gauge in which one end of the wire is connected to the force summing means and the other end of the wire is connected to a fixed point, it is necessary to limit the motion of the force summing means so that it does not cause a strain in the wire such that the stress exceeds the elastic limit of the wire. For wires of steel or constantan, which are most generally used in this art, such strain wire transducers are designed to limit the total strain to be produced in the wires to be not greater than 0.0015 in./in. in a zero centered instrument (i. e., with an initial strain of 0.0015 inch per inch and a total maximum strain of 0.003 inch per inch). The corresponding stress is far below the actual elastic limit of the wire, and this limit of strain is used in order to introduce a safety factor of about 1.3 to 1.5, depending on the wire employed and other practical considerations. Even when employing a permissible total strain of 0.003 in./in., it is the practice, particularly in small gauges such as the so-called subminiature gauges now commercially sold, to set stops to limit the motion of the force summing means so that the wire is stretched only eighty per cent of the permissible additional extension set by the factor of 0.0015 in./in. This factor of safety is necessary because the stops which are used cannot be set with an accuracy which will permit the strain to create a stress which would be up to, but not beyond, the elastic limit, and also because the stops cannot be considered absolutely rigidly defined surfaces.

Stops are usually set screws having a given modulus of elasticity; and the force summing means and the framework in which the transducer is mounted are also elastic members, i. e., the metal itself has elasticity. Consequently, an inaccuracy is introduced equal to the sum of the above elastic effects. The wire may thus be strained an amount greater than that which is determined by the position of theoretically rigid stops set at the limits previously referred to. For example, if steel having a modulus of elasticity of 30 million pounds per square inch (p. s. i.) were used in the frames and stops, 100 p. s. i. of force against the stops would give a deflection of 3.33 microinches/in. due to the elastic effects discussed above. If the stops and frame of the transducer were made of constantan, assuming a modulus of about 20 million p. s. i., the deflection due to elastic effects of a pressure of 100 p. s. i. would be equivalent to 5.0 microinches per inch, or considerably more than the deflection for steel.

In a transducer having strain wire with a length of one inch, set with an initial strain of 0.0015 inch per inch with stops set to permit an additional strain of .0015 inch per inch, the resultant elastic deformation at the stops could result in a strain in the wire in excess of the above figure. In order to avoid this, the stops are set so that the elastic deformation of the gauge, when added to that of the wire, does not result in a strain on the wire in excess of the safe limit described above. As a result of these considerations, the present practice is to set the stops at eighty per cent of the maximum permissible deflection, using the factor of 0.0015 in./in. of wire, so that the gauges are over-designed with a factor of safety of 1.25, which is superimposed upon the generous factor of safety implied by using 0.0015 in./in., or a total factor of safety of above 1.6 to about 2. Consequently, the wires in the present design are employed far below the capacity to produce electrical output in an optimum design for an electrical bridge circuit.

Another difficulty present in the prior art designs results from the elasticity of the metal employed in the transducer. As the force summing means approaches the stop and exerts a force against the stop, the motion of the force summing means no longer produces the same changes in stress in the wire per unit of movement of the force summing means as it did during the approach to the stops, i. e., the proportionality of strain exerted in the wire to the force exerted on the force summing means will not be the same after the force summing starts to stress the stops, and is in fact less than during the approach to the stops. This is a result in the compressibility of the transducer frame and stops described above. Consequently, during this latter portion of the motion of the force summing means, the variation in strain in the wire is a non-linear function of the movement of the force summing means. Therefore, in order to obtain a unit with true linearity, the instrument must be used in the range below that to which the instrument could theoretically respond.

As a result of all these factors, the instrument designed employing stops must be made oversize for the service for which it is designed.

It is one of the objects of my invention to design a variable electrical resistance strain wire transducer which can obtain essentially the maximum available safe total strain from a wire of given length without exceeding the safe strain, and could be strained to the above gauge limits with true linearity of the relationship of the strain in the wire to the motion of the force summing means.

It is another object of my invention to design a strain wire transducer of high natural frequency by limiting the mass added to the force summing means to a minimum amount, while, at the same time, employing a four-arm bridge.

In my previous applications, Serial No. 354,294 filed May 11, 1953 and No. 354,295 filed May 11, 1953, and Patent No. 2,455,883 issued December 7, 1948, I have developed instruments having a high natural frequency by reducing the mass of the transducer which is attached to the force summing means, and I have obtained that result by attaching a strain wire to the force summing means and to a fixed point, so that the mass which is added to the force summing means results from the attachment of the wire to the force summing means and from the mass of the wire itself. Such transducers had the advantage that they eliminated armatures, linkage pins, and other mechanical connecting means. It was, however, not possible in such designs to devise a four-arm bridge without doubling the length of the transducer.

It is a further object of my invention to modify the above design in order to produce an electrical strain wire transducer in which the wires may be connected as a four-arm bridge to obtain a transducer having a small mass and high natural frequency without increasing the size of the transducer. Or, conversely, if one is satisfied with the electrical output of the two-arm bridge, the same electrical output can be obtained by a transducer of substantially half the length of the transducers described above.

In present wiring techniques for production of the transducers of the prior art, the strain wires are wound about their supports, usually insulating pins, under a predetermined tension, so that the wires are in equal tension. Various means have been devised for this purpose, such as placing the wire under a predetermined tension while winding. This requires either special apparatus or considerable skill. In the instrument of my invention, the instrument is self-calibrating, so that the instrument may be wound to give a predetermined tension in the strain wire.

Since, as a practical matter, the transducers are mounted in a rigid case, or other member, the variations in temperature introduce a variable in the operation in the point of the differential expansion between the wire of the transducer, the frame on which the wire is mounted, the force summing means, the case, and other elements of the construction. This results in a stressing of the wires even though no force is imposed on the force summing means. The zero point of the gauge thus shifts with changes in temperature.

In the transducers of my invention, I introduce a compensating mechanism whereby the effect of the differential expansion may be minimized and substantially suppressed.

The above and other objects of my invention are realized in an electrical strain wire gauge forming the instant invention, which is in the form of a transducer consisting of a force summing member, a strain sensitive filament composed of two filamentary elements, one of the elements being attached to the force summing member, extending therefrom to a first point of attachment, and the other of the elements extending from the first point of attachment to a second point of attachment, in such manner that the first point maintains a tension on each of the elements, and the variation in tension of the element attached to the force summing means responsive to the motion of the force summing means causes a variation in the other of said elements in an opposite direction.

The second point of attachment may be one which is not displaced in space on motion of the force summing means, as for example, it may be fixed rigidly in space by attachment to a fixed point in the case or frame of the transducer. However, it may be a movable point so that it is displaced in space relative to the motion of the point of attachment of the wire to the force summing means, so that the change in tension of the active wires connected to the aforementioned points is different. Thus, the second point of attachment referred to above may move in an opposite direction to the point of attachment of the wire to the force summing means so that the tensions in the wires caused by the motion of the force summing means change in opposite directions.

The magnitude of this change in the wires in the aforementioned forms of the transducers of my invention may be unequal or made to be substantially equal, with a resulting difference in the electrical efficiency of the transducers as will be more fully described below.

In a preferred embodiment of my invention, the first point of attachment is subject to a constraint other than that imposed by the filaments; and it is further desirable, and to be preferred, that the ratio of the constraining force exerted on the movable point to the motion of the first point, which may, for convenience, be referred to as the spring rate of the first point, be less and preferably a small fraction of the spring rate of the wire, i. e., the ratio of the force exerted in tension on the wire to the elongation of the wire thus produced.

In the transducers of my invention, when the second point of attachment is fixed on the frame member of the transducer, when the spring rate of the first point is zero, the forces exerted on the wires are equal and opposite, or move with respect to the end of the wire attached to the force summing means in an algebraically different amount, and the change in tension in one of the elements is equal and opposite in sign to that of the first element, the force transfer from one of the elements to the other of the elements is thus 100%. However, as the spring rate of the first point increases, i. e., becomes stiffer, the force transfer falls from 100% and becomes zero when the first point may be considered to be a rigid point, and the wire extending from the first to the second point becomes entirely inoperative as an active wire of the bridge. I have discovered, however, that by employing a spring rate for the first point less than the spring rate of the wire I can obtain a substantial proportion of the theoretical electrical output of the bridge in the range of above about 75% of the theoretical output and by limiting the spring rate of the first point of attachment in the range of about 0.01 and even about .001 of the spring rate of the wire, I may increase the electrical efficiency of the bridge to more than about 99% of the theoretical efficiency of the bridge.

When I employ a configuration in which the motion of the second point is equal to and opposite to the motion of the point of attachment to the force summing means, I may obtain substantially the theoretical electrical output of the bridge irrespective of the spring constant of the first point of attachment. The force transfer from one of the wires to the other of the wires may be substantially 100%.

While the spring constant of the first point of attachment has the above effects on the electrical output of the bridge, it has a separate and important effect in permitting the avoidance of stops to limit the motion of the force summing means.

As described above, the character of the winding of the transducer of my invention, results in a variation in tension in the first wire element connected to the force summing means and to the first point of attachment which is opposite in direction to the consequent variation in tension in the second wire element connected to the first point of attachment and the second point of attachment. Thus, an increase in tension in one of the wires results in a decrease in tension in the other of the wire elements.

If the transfer of force on the wires is substantially 100%, then the wire is not increased in tension by an amount greater than that by which the other wire is relaxed in tension. By winding the wires in equal or unequal tension so that the initial tension on one of the wires when added to the tension on the other of the wire elements of the bridge, does not exceed in total sum the ultimate tensile stress imposable on any of the wires at the safe limit, or the stress at the proportionality limit of the wire, the movement of the force summing means will not stress the wires beyond the design limit thus imposed.

When the transfer is not sbstantially 100%, by making the spring rate of the first point sufficiently low as compared with the spring rate of the wire, the increase in tension occurring in one of the wires on continued movement of the force summing means after the complete relaxation of the second wire of the bridge, may be such as to cause but an insignificant addition to the total stress on the wires still under tension, and thus as a practical matter, giving effect to the magnitude of the movements encountered in force summing means in practical operations, thus resulting in a total stress on the wire which does not exceed, in any substantial amount, the aforesaid design limit.

The general form of the transducer of my invention comprises a pair, or a plurality of pairs, of like filaments whose electrical resistance is varied by variation in the strain imposed on each of the filaments. The filaments of each pair, wound as previously described, are electrically connected at their ends, and are joined together to a yieldable constraining means. The opposite ends of each of the wires are connected so that at least one of them is connected to a force summing means, and an end of the other of the filaments of the pair of filaments is so attached to a wire support that, upon displacement of the force summing means, the ends of each of the wires move relative to each other, so that the variation in strain imposed on one of the filaments by the force summing means is transfered to the second filament of the pair to cause a variation in strain in the opposite direction.

The tension in the wires of each pair, which change in the same direction on motion of the force summing means, may be made equal.

The differential motion may be attained by attaching one of the wires to a force summing means and the other to a point so rigidly fixed on a frame member, in comparison to the ends attached to the constraining means, as to be deemed to be a point fixed in space.

On the other hand, the second filament, instead of being attached to such a fixed point, may be attached to a means positioned with respect to the frame so that it moves in a direction opposite to the movement of the force summing means, or to give an otherwise differential motion between the force summing means and the first mentioned means.

In either case, a motion of the force summing means, which causes a variation in strain in the filament attached to the force summing means, is accompanied by a variation in strain in the other of said pair of filaments which is in the opposite direction, and also a deflection of the ends of the wires attached to the constraining means.

It is a characteristic of the transducers of my invention that the sign of the variation in strain in the filaments of each pair is opposite, to wit, the tension in one increases while it decreases in the others of the filaments of each pair. The magnitude of the variation is a function of the ratio of the spring constant of the constraining means to the spring constant of the filaments, approaching equality as the spring constant of the constraining means approaches zero.

By spring constant I mean, in the case of the constraining means, the ratio of the force exerted to the deflection of the constraining means, and, in the case of the filaments, the ratio of the stress to the strain.

The transducers of my invention will be more fully described in connection with the accompanying drawings, of which:

Figure 1 is a sectional view of one form of my invention in which the transducer is applied to a pressure gauge;

Fig. 2 is a section taken on line 2—2 of Fig. 1;

Fig. 3 is a section taken on line 3—3 of Fig. 1;

Fig. 4 is an edge view of Fig. 3;

Fig. 5 is a perspective view of a detail of the transducer of my invention;

Fig. 11 is a section taken through an accelerometer employing the transducer of my invention;

Fig. 12 is a section taken on line 12—12 of Fig. 11;

Fig. 14 is a section taken on line 14—14 of Fig. 13;

Fig. 15 is a fragmentary detail of section taken on line 15—15 of Fig. 13;

Fig. 16 is an irregular section, with parts in elevation, taken on line 16—16 of Fig. 15;

Fig. 17 is a perspective view of a detail of the transducer shown in Figs. 13 to 16 inclusive;

Fig. 18 is a plan view with some parts in section taken on line 18—18 of Fig. 21;

Fig. 19 is a section on line 19—19 of Fig. 18;

Fig. 20 is a section taken on line 20—20 of Fig. 18;

Fig. 21 is a section taken on line 21—21 of Fig. 18;

Fig. 22 is an irregular section through another form of transducer of my invention, taken on line 22—22 of Fig. 23;

Fig. 23 is an irregular section taken on line 23—23 of Fig. 22;

Fig. 24 is a section taken on line 24—24 of Fig. 22;

Fig. 25 is a section similar to Fig. 22 illustrating a modification of Fig. 22;

Figure 28:
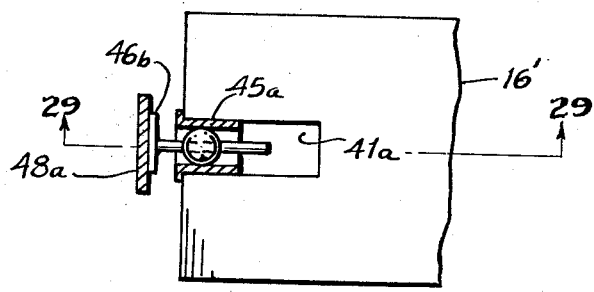
Figure 29:
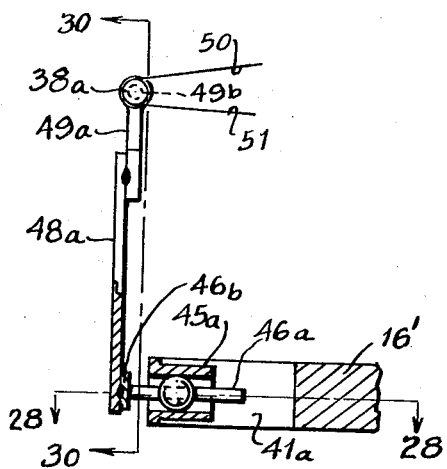
Figure 30:
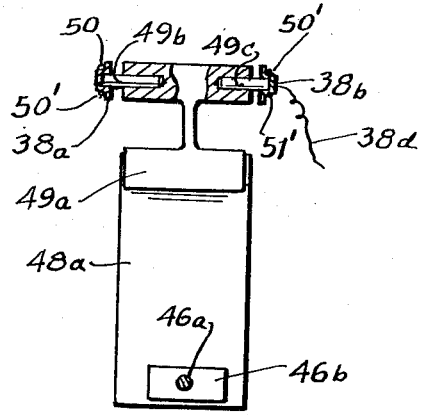
Figure 33:
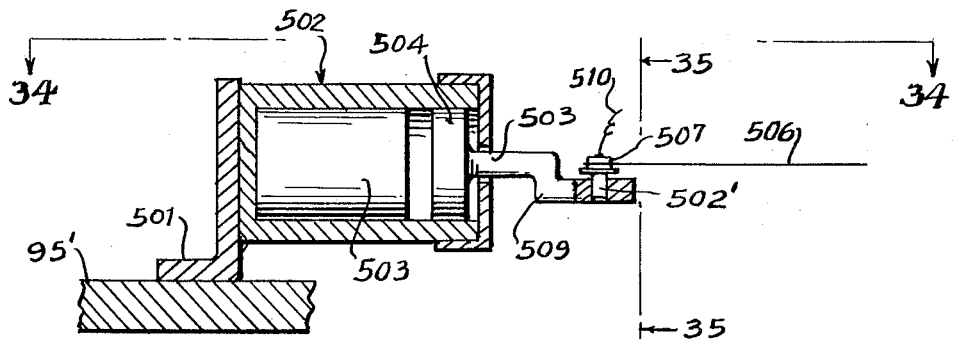
Figure 34:
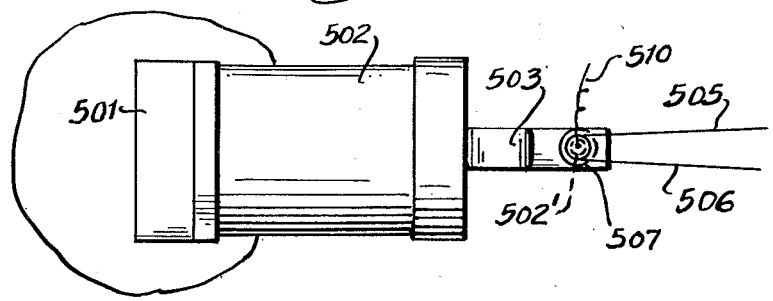
Figure 35:
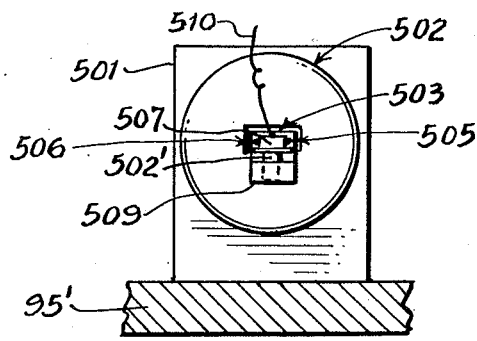

Fig. 25ª is a detached view of the mounting of the strain wires shown in Fig. 25;

Fig. 26 is a section taken on the line 26—26 of Fig. 25;

Fig. 27 is a section taken on the line 27—27 of Fig. 25;

Fig. 28 is a detailed view partly in section taken on the line 28—28 of Fig. 29;

Fig. 29 is a view partly in section taken on line 29—29 of Fig. 28;

Fig. 30 is a view partly in section taken on the line 30—30 of Fig. 29;

Fig. 31 is a view in detail of modification of the spring mounting shown in Fig. 18, with parts broken away and in section;

Fig. 32 is an edge view of Fig. 31;

Fig. 33 is a view in section showing a modification employing a magnetic spring;

Fig. 34 is a top plan view of Fig. 33 taken on line 34—34;

Fig. 35 is an end view of Fig. 34 taken on line 35—35.

In the device of Figs. 1 to 10, the case 1 of the transducer has a flange 3 carrying a counterbore 2 in which is set a ring fitting 4 closed by a diaphragm 5, making a peripheral fluid-tight joint with a suitable counterbore in the fitting 4. A second fitting 6 is mounted on the fitting 4, and the assembly is joined by means of studs 7 to give a fluid-tight chamber 9 connected to a central bore 8 in the fitting 6.

The rod 10 is centrally mounted on the diaphragm 5 and extends through a central bore 11 in the ring fitting 4, and is connected at its other end to a leaf spring 13 formed integrally with the arcuate clamping plate 12. Clamping plate 12 is clamped between the ring section 14 of the L-shaped bracket 15 whose leg 16 extends into the case 1. The bracket frame member 15 is mounted on the ring fitting 4 by the studs 17. The rod 10 passes through the central bore of the fitting 4 and through a suitably provided bore in the spring 13. The rod 10 carries a shoulder 18 and a spacer head 19. The spring 13 is clamped between the shoulder 18 and the spacer 19 by means of a nut 20 screwed on the threaded end of the rod 10.

Mounted in the leg 16 of the bracket 15 is an adjusting bar formed by milling a block to give two slots 30 and 31 separated by a flat leaf spring 24 connecting the top 23 and bottom 22. The adjusting block is mounted centrally on the leg 16 adjacent the fitting 4 by means of a screw 33 which passes through the leg 16. The adjusting screw 33 passes the threaded bore 35 and abuts against the underneath side of the end 26. The stud 33 may be locked in position by means of nut 36. The spacer 19 projects centrally into the space 30.

Mounted in the head 19 are two electrically insulated pins 37 and 37' press-fitted into two axially aligned bores extending into the head 19 with their axis perpendicular to the axis of the rod 10. Pressed on the ends of each of the pins 37 is a metallic cap 38 and 38' (see Fig. 10). Similar pins 39, 39', 40 and 40' are positioned in bores 28 and 29, one pin on each side of the ends 23 and 22 of the adjusting block 21. These pins also carry the end caps 38 and 38'. The ends of the caps 38 and 38', and pins 37 and 37', are aligned with the pins 39 and 39' and their caps.

Bent springs 41 and 41' connect the caps on pins 37 and 37' electrically with the caps on pins 40 and 40' by means of a spot welding or brazing. Mounted in suitable bores in leg 16 are insulated terminals 42, 42', 43 and 43'.

End slots 44 and 44' are provided in the end of leg 16. Brazed in ends of the slots are insulated terminals, each composed of a rod 46 and 46' extending through insulating glass ball 47 carried in the sleeve 45 brazed in the slot 44. To the rods 46 and 46' of each terminal are spot welded to coplanar preferably identical metallic leaf springs 48 and 48' respectively. The springs carry at their upper end a hook 49 and 49' respectively.

Electrical resistance strain wires, such as are conventionally used in electrical resistance strain wire transducers, are stretched in tension, one wire 50 from the cap on pin 39, to which it is soldered, and over and under and soldered to hook 49, and wire 51 extending to and around the cap 38 on pin 37, to which it is soldered. Like strain wires 50' are stretched in tension from the cap on pin 39', to which it is soldered, and over and under and soldered to hook 49', and wire 51' extending from the hook to and around the cap on pin 40 to which it is soldered. There are thus four strain wires, forming two pair; one pair 50 and 51, and a like pair 50' and 51' similarly tensioned. Instead of a single wire, the wire may be used in multiple turns between the caps and hook, as is conventional in electrical strain wire transducers.

The device is preferably designed so that lines extending from the hooks 49 and 49', perpendicular to the plane of the springs 48 and 48', bisect the angle between the wires 50 and 51, and between wires 50' and 51', respectively. The length of the wires 50, 51, 50' and 51' between their points of attachment at their respective pins and hooks are preferably the same. The included angle between the wires 50 and 51, and also between 50' and 51', is preferably made small and as close to parallelism as is mechanically convenient. This may be accomplished by a proportioning of the separation between the hook 49 and the pins 39 and 37, and also the separation between the pins 39 and 37, as well as the diameter of the hook at the point of attachment. The same relationship may be employed for the companion hook 49' and pins 39' and 37'. The greater the included angle between the wires the less the sensitivity of the instrument, that is, the less the change in resistance of the wires on any given deflection of the diaphragm 5. However, if it is desired to permit for a large deflection of the diaphragm within the safe range of the variation in strain of the wires, the angle between wires 50 and 51, and also between 50' and 51' may be increased, but should be less than 180°. The included angle between each pair of wires is preferably made the same unless electrical compensating means are introduced for the different outputs produced by each pair of wires which results from such inequality in included angles.

The plane of the axis of the wires, where single wires are used, or the axis of symmetrical loops of wires where loops are used for the strain wires 50, 51, are coplanar, as are those for wires 50' and 51'. The variation in the strain in these wires will thus not produce a moment about the hook over which they pass and to which they are affixed.

The caps on pins 39 and 39' are electrically connected to terminals 43 and 43', and the caps on pins 40 and 40' are electrically connected to terminals 42 and 42'. The terminals 46, 46', 43, 43', 42 and 42' are electrically connected to terminals 52 mounted in terminal plate 53, for connection into a Wheatstone bridge arrangement.

In the form of device illustrated in Figs. 1 to 10, inclusive, I have illustrated the device as including four active arms which may be electrically connected in the conventional manner into a Wheatstone bridge arrangement in which all wires vary in tension on displacement of the force summing means. However, if desired, I may employ only two active arms, for example, only wire or wire loops 50 and 51, omitting 50' and 51' and the spring 48' and their respective pin connections, and employing two additional resistance arms to complete the four arms of the Wheatstone bridge.

Figure 6:
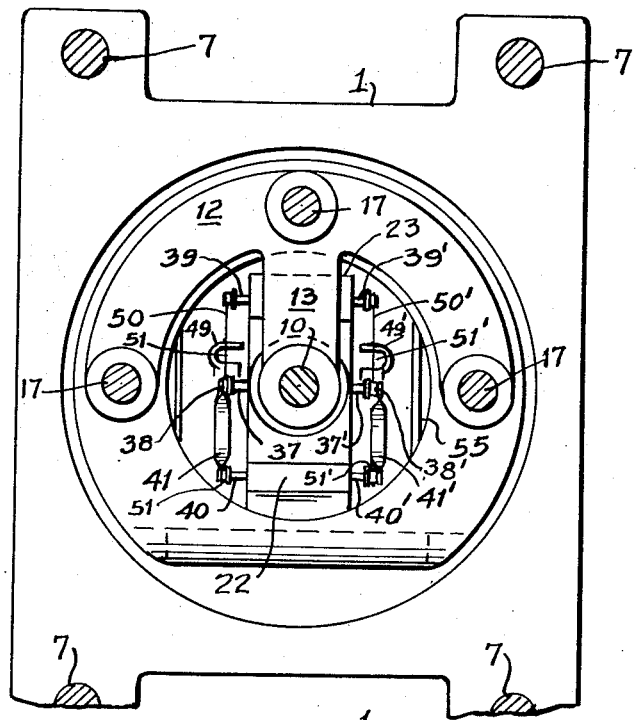
Fig. 6 is a section taken on line 6—6 of Fig. 1.
Figure 7:
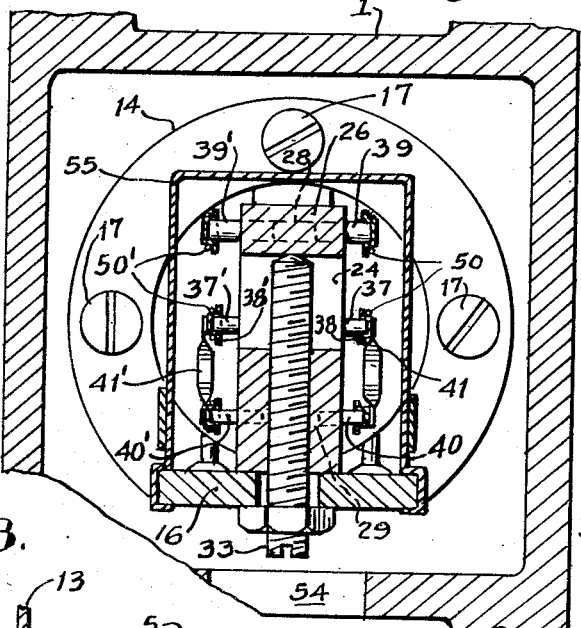
Fig. 7 is a section taken on line 7—7 of Fig. 1.
Figure 8:
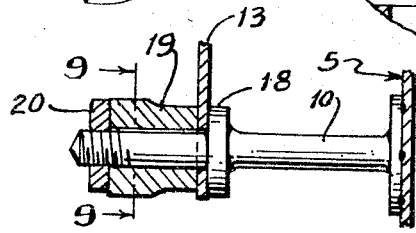
Fig. 8 is a detail partly in section of the gauge of Fig. 1.
Figure 10:
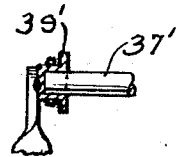
Fig. 10 is an enlarged detail of Fig. 9.
Figure 9:
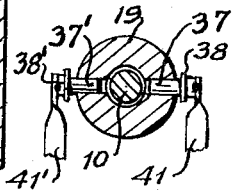
Fig. 9 is a section taken on line 9—9 of Fig. 8.

Encasing the wire assembly is a sleeve or lining 55 which may be snapped into the leg 16 (see Figs. 1 and 7).

The tensions in the wires of each pair of wires 50 and 51, and also in wires 50' and 51', are both equal or unequal, and may be adjusted by adjusting the set screw 33. It is to be observed that the rigidity of the leg 24 and also the back-up provided by the set screw 33 fixes the pins 39 and 39' rigidly in position after the position of leg 26 is adjusted by the set screw 33. That is to say, variation in tension in the wires 51 and 51' will not cause any displacement of the pins 39 or 39' which will have any significant effect on the relative tensions in the wires 50 and 51 or 50' and 51'. Both sides, i. e., wires 50 and 50', and 51 and 51', are similarly wired and tensioned.

In the above assembly, the pair of wires 50 and 51, and the pair of wires 50' and 51', may be suitably tensioned so that the sum of the tensions in the wires of each pair does not exceed, and usually is less, than the ultimate tensile stress of the wire to insure that such stress is not attained in wire 50 or 50' when the wire 51 or 51' goes slack and thus avoids breaking of the wires 50 and 50'. Where the yield point of the wires is not close to the breaking point it may be desirable in order to avoid damage to the wires to make the total tension in the two wires of the pairs not to exceed this yield point, or the proportionality limit of the wires, whichever design limitation of stress is chosen. The proportionality limit is, as well understood in this art, the maximum strain which is a linear function of the stress. At all strains at and below this value, ratio of stress to strain, i. e., the spring constant, is a constant and beyond which it is not constant.

Thus, for example, the wires 50 and 50' may be stressed in tension between the hook 49 and the pins 39 and 39' at one-half of the stress chosen as the design limit, as explained above, and the stress in wires 51 and 51' may be equal thereto, or the stress in wires 51 and 51' may be made a greater fraction of the design limit, say 80% thereof, and that in the wires 50 and 50', 20% thereof.

In order to ascertain the maximum strain to be imposed on the wire, the leaf spring may be calibrated by attaching the wire to the hook and pulling on the wire and noting the deflection of the spring 48 when the wire breaks. Then in winding the assembly, tension is placed on the wire 51 sufficient to deflect the spring, for example, 80% of the deflection occurring when the wire broke in the above calibration. The wire 50, however, is stretched but a fraction thereof; thus, for example, with a tension of 20% of the tensile strength. The tension in the wires 50 and 50' may be adjusted by biasing the wire by spring 24, adjusted by the screw 33, access thereto being provided by bore 54 in case 1.

It will be observed that when fluid pressure is imposed on the diaphragm 5 through the inlet 8, tension is reduced in 51 and 51', i. e., they go into compression while tension is increased in the wires 50 and 50'.

It will be observed that the increase in strain in the wires 50 and 50' is equal to the deflection of the spring in a direction back to perpendicular resulting from the decrease as shown in the wires 51 and 51'. From which it will be seen that $$dl_3 = dl_2 = \frac{k_1 dl_1}{k_2 + k_1} \quad \text{(Equation 1)}$$

where $dl_1$ is the decrease in strain in the wires 51 and 51'; $dl_2$ is the deflection of the cantilever spring 48 or 48'; and $dl_3$ is the increase in strain in the wires 50 and 50', and $k_1$ is the spring constant of the wires 50, 50', 51 and 51', all of which are alike, and $k_2$ is the spring constant of the spring.

Since the electrical output, i. e., the degree of unbalance of the Wheatstone bridge into which the wires are wound, as is conventional in four-wire bridges of the prior art, upon any deflection of the diaphragm 5 is proportional to the sum of the changes in strain in the wires 50, 50', 51 and 51'

$$\text{Output} = K\left[dl_1 + \left(\frac{k_1 dl_1}{k_2 + k_1}\right)\right] \quad \text{(Equation 2)}$$

where K is a proportionality constant depending on design parameters.

This equation shows that the output of the bridge upon any variation in strain in wires 50, 50', 51, and 51', resulting from any given deflection of the diaphragm depends on the ratio of the spring constant of the springs to that of the strain wire, i. e., the less the spring constant of the spring, the greater the output. Thus, at the limit where the spring constant of the springs is zero, the output is given by the following equation:

$$\text{Output} = 2K dl_1 \quad \text{(Equation 3)}$$

where the spring constant of the spring is infinite, i. e., the element is a rigid body and $k_2$ is infinite:

$$\text{Output} = K dl_1 \quad \text{(Equation 4)}$$

or one-half of the output when the spring constant is zero.

If we define the efficiency of the unit with a zero spring constant for the springs 48 and 48' as 100%, then with a rigid support, i. e., with infinite spring constant at the hook 49, the efficiency will be 50%.

These efficiencies also give the relative degree of transfer of force or stress from the wires 50 and 50' to wires 51 and 51', or vice versa. When the spring constant of the spring is zero, the transfer is 100%, and when the wires are affixed to a rigid support at the hook, the transfer is zero. For example, it may be shown that when the ratio of the spring constant of the spring 48 and 48' to the wire 50, 50', 51 and 51' is less than .01 and in the range of about .01 to about .001, the efficiency will be 99.5 to 99.95%, and when the spring constants are equal the efficiency is 75%.

By reference to what has been said before, it will appear that the decrease in strain of the wires 51 and 51' on application of pressure to diaphragm 5 cannot proceed to a degree greater than the complete relief of the initial strain in wires 51 and 51', i. e., up to a force where the wire goes slack. Consequently, giving effect to the efficiency of the transfer of the stresses from one wire to the other wire, resulting from the effect of the spring constant of the springs 48 and 48', as described above, the transfer of the stress to the wires 50 and 50' cannot be greater than the decrease in the stress in the wires 51 and 51'. On total relaxation of stress in the wires 50 and 50', the strain imposed on wires 50 and 50' is only that of the spring 48. Thus, for example, if the original stress in the wires 51 and 51' is X% of the proportionality limit and that in wires 50 and 50' is (100—X)% of the proportionality limit, the transfer of the stress, where wires 51 and 51' go entirely slack, cannot stress the wire 50 or 50' beyond the proportionality limit. The wires cannot thus be stretched beyond the design limitations and cannot be thus injured. Furthermore, the output of the gauge will be linear clear up to the limits enforced by the original stress introduced into the wires, as described above.

It will also be observed that, if for some reason, the diaphragm 5 is caused to deflect to the right as viewed in Fig. 1, then wires 51 and 51' will increase tension and wires 50 and 50' will lose some of their original tension. It will be observed that this loss of tension cannot exceed the original tension in the wires 50 and 50'. The only restraint on the wire 50 is that of the spring 48, and on 50', that of spring 48'.

Since the spring constant of the spring is made to be a fraction of the spring constant of the wire, it will take an extremely large deflection of the diaphragm to cause a dangerous increase in strain in the wire beyond the point where one of the wires goes slack. Thus, reverting to our example, if the spring constant of the spring 48 is 0.01 of the spring constant of the wire, and assuming that it is desired to limit the strain in the wires not to exceed 0.003000 inch/in., and that the original strain in wire 50 is set at 0.001485 inch/in., and in wire 51 at 0.001485 inch/in., the deflection of the diaphragm which results in a reduction in the strain of the wire 50 in an amount equal to 0.001485 inch/in., will not strain the wire 51 beyond 0.003000 inch per inch. Likewise, when the diaphragm moves to increase the strain in wire 51, and to increase this strain in the wire an amount equal to .00001 inch/inch, will require a deflection of the spring of substantially 0.001 inch per inch and a deflection of the diaphragm equal to substantially 0.001 inch. If the above design factors are used, the permissible maximum strain may be 0.0003 inch, and thus the permissible diaphragm deflection beyond the point where one wire goes slack would be 0.0015 inch. It can thus be seen that the diaphragm 5 will in all usual situations be damaged before the wire 51 is stressed to any dangerous degree.

While because of the choice of the proper spring constants, the permissible deflection of the diaphragm makes the use of stops unnecessary to protect the wires, stops to prevent injury of the diaphragm may be added and these will assure that the diaphragm will not be stressed so as to injure the diaphragm and result in gross damage to the diaphragm and wires.

It is to be observed that in all ordinary circumstances the gauge shown in Figs. 1 to 10 is operated so that the wire 51 does not go into compression, and if the gauge is to be used as a vacuum gauge the wiring may be revised so that the tension in the wire connected to the diaphragm 5, when used as a vacuum gauge, decreases.

The transducer may be applied to an accelerometer or other device capable of imposing a displacement of the rod 10, since the transducer essentially measures this displacement.

In Fig. 11 and Fig. 12 is illustrated the adaptation of the transducers of my invention shown in Figs. 1 to 10 to an accelerometer. The fitting 6 of the form shown in Figs. 1 and 2 is removed.

A weight 56 is mounted in the bore 57 on two springs 58 and 59. Spring 58 is mounted between the ring fitting 60 and fitting 61 by means of screws 62, and spring 59 is mounted in a suitable internal shoulder provided in fitting 61 by means of screws 63. The springs 58 and 59 are connected to the weight 56 by screws 63'. The weight 56 carries a rigid plate 64, carrying orifices 65 to which the rod 10 may be axially rigidly attached by means of nuts 66.

Fitting 61 is mounted on case 1 by means of ring fitting 60 similar in construction and function to fitting 4 of Fig. 1. The fitting 61 has an inwardly extending flange 67 on which is seated fitting 68 by means of O-rings 69 and carrying a plate 70 in which there is a bore 71. A diaphragm 72 is clamped between fitting 68 and 70 which makes a fluid-tight seal by means of O-ring 74 providing a chamber underneath the diaphragm 72 which is in communication with the case 1. The assembly is locked in place by means of lock plate 75. The space above the diaphragm 72 is thus connected to ambient pressure through bores 76' and 77.

The strain wire transducer employed in the accelerometer described above is constructed and wound in the same manner as in the pressure transducer shown in Fig. 1. The wires are, however, if the accelerometer is permitted to oscillate both sides of the neutral rest axis, wired so that each wire is equally tensioned and equal to not more than one-half of the safe limit of design stress, as described above.

By proper proportioning of the spring ratio of the springs 58 and 59 to the spring constant of the spring 48, an additional safety factor may be introduced. Since, however, the frequency of response of the accelerometer, and therefore both the range of the accelerometer and displacement of the mass, all other things being equal, depends on the stiffness of the springs 58 and 59, or on the connection between the weight 50 and the rod 10, as is more fully described in my co-pending application Serial No. 430,336, filed May 17, 1954, it is possible to obtain a flexibility in design to obtain desired high or low frequency response and wide ranges of response and acceleration and wide variations in deflection of the mass without injury to the wires.

All of the inner space of the case and fitting underneath the diaphragm 72 is filled with an electrically nonconductive liquid, a suitable plug 78 which may be inserted in the bore 54 used for access to the set screw 33 (see Fig. 1). This liquid is used as a damping fluid, as is conventional for damping of accelerometers.

It will be observed that the imposition of an accelerating force in either direction along the longitudinal axis of the device will cause the weight to move on the springs 58 and 59 to displace the force summing rod 10, which then transmits its displacement to the wires to vary the strain, as described above.

As has been previously described in the transducer of my invention, the efficiency of electrical output from the bridge in which the wires are electrically wound depends upon the ratio of the spring constant of the wire to that of the spring to which the wires are attached.

In Figs. 13 to 16 is illustrated the application of my invention to a form of transducer wherein the end of one of the wires is connected to a force summing means, while the other wire is connected to a point which moves. In the form of the transducer shown in Figs. 1 to 10, inclusive, the ends of wires 50 and 51, not attached to the spring, move relative to each other, one of them being stationary and affixed to a point fixed rigidly in space. In the forms illustrated in Figs. 13 to 16 both points move and move relative to each other. In the particular embodiment chosen to illustrate the principle of my invention in Figs. 13 to 16, the points of attachment move in opposite directions, when one of the ends attached to the force summing means is displaced in space.

Figures 13 to 17 illustrate a variation of the strain wire transducer of my invention illustrated as applied to an accelerometer in which the inertial mass is substantially entirely a liquid mass.

Figure 13:
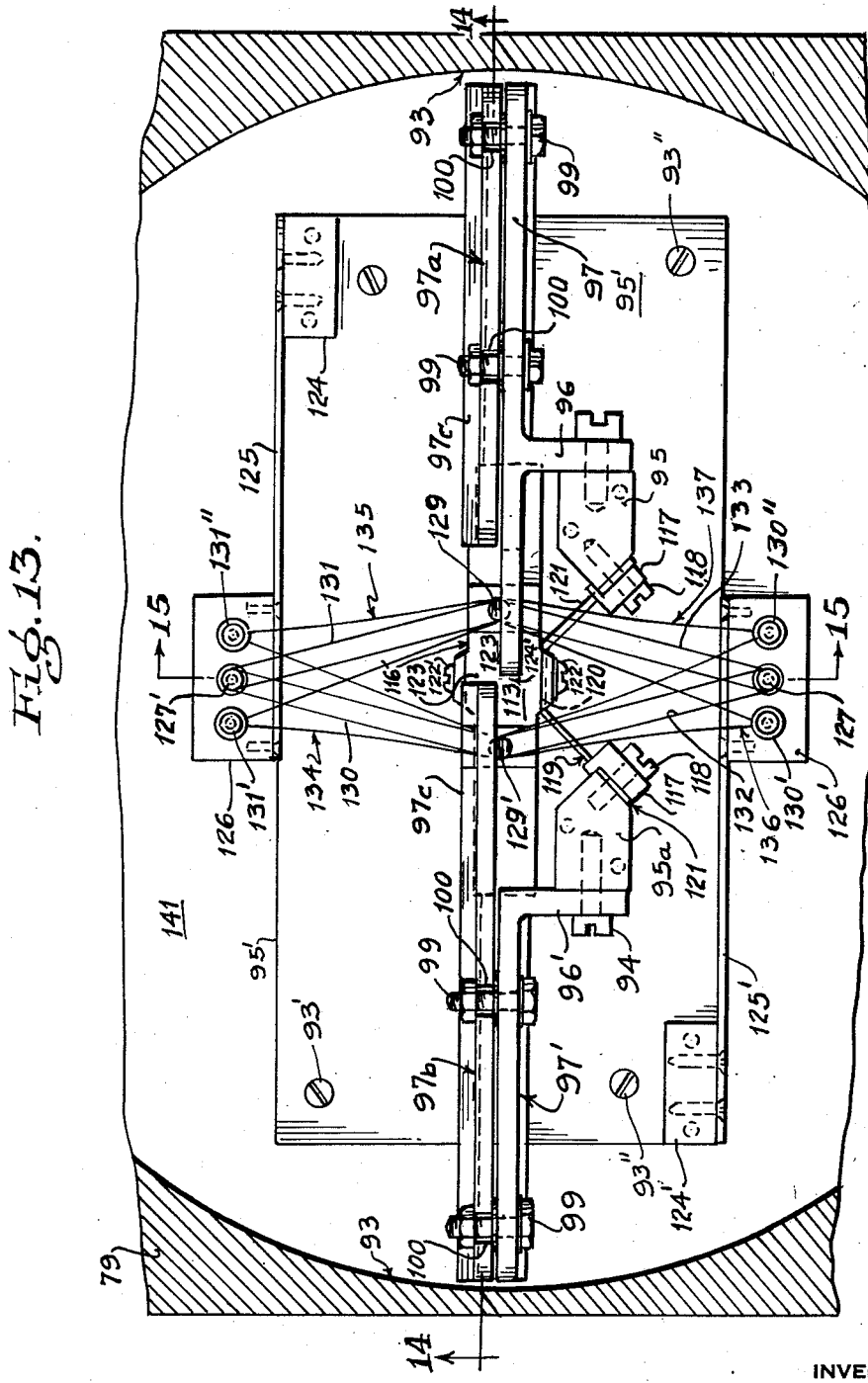
Fig. 13 is a horizontal section through another form of transducer of my invention.

Referring particularly to Figs. 13 to 15, the container 79 is shown as containing a cylindrical cavity, but may be of any shape provided that it is a closed container. The container is closed by a bottom 80 and a top 81. The bottom 80 carries a depending circular flange 82, to the lower end of which is secured a removable cover 84 held in place by snap ring 86 maintained in a suitable groove in flange 82. An O-ring 87 is positioned in a groove 87' located in a horizontal shoulder 87'' intermediate the ends of flange 82. The top 81 is held in position on the upper wall of the case 79, with the lower end portion of member 81' resting on a horizontal shoulder 83' formed by a recess in the wall. Secured to top 81 by means of bolts 88 passing into an outer upwardly extending flange 89 of the top 81 is a cover 90 having a depending flange 91. Positioned between the lower end of flange 91 and the top of flange 89 is a flexible diaphragm 92 held in place by the bolts 88. Flange 89 has an annular recess 89' therein to accommodate an O-ring 87 for sealing purposes.

As seen in Figs. 13, 14 and 15, a plate 95' is attached to the base 80 by means of screws 93'' located at the corners of member 95' (see Fig. 13). Securely mounted on the frame plate 95' is a pair of brackets 95 and 95a. Baffle plates 97 and 97' are mounted on the brackets 95 and 95a by means of lugs 96 and 96' by studs 94. The plates 97 and 97' extend from the center close to the adjacent wall of the container and upwardly to the top 81. It is notched out similarly to that described in connection with plate 97b to permit the passage of the wire supporting pins, as will be described below. Plate 97' is similar in construction to plate 97 and is similarly mounted and extends horizontally to the wall of the container, and is of a height similar to plate 97. It extends, however, to the edge of the notch in plate 97b, as will be described below.

The plates 97a and 97b are adjustably mounted on the plates 97 and 97' by means of bolts 99 passing through slots 100 in the plates 97a and 97b. Plate 97b extends longitudinally close to the edge of the container and upwardly close to the top 81. It is notched adjacent the pins 129' to accommodate the pins and the strain wire.

The plates 97a and 97b have a flange 97c which extends along the entire lower longitudinal edge of the brackets and overlaps the edge of the paddle 113. Bolts 99 pass through slots 100 in the plates 97a and 97b, the slots being provided for vertical adjustment of the baffles to vary the distance between the lower edges of the baffles and the paddle 113 described below.

A pair of lower baffles 103 and 103' are positioned directly below and in alignment with the upper baffles 97, 97', 97a and 97b (see Figs. 14 and 15). The outer edges of baffles 103 and 103' are also spaced a short distance from the adjacent container wall sections 93. The baffles 103 and 103' are secured by means of bolts 105 to a longitudinally extending bracket 107. The bolts 105 pass through slots 103a in baffles 103 and 103' for vertical adjustment of the baffles.

Positioned in the space between and parallel to the adjacent longitudinal edges of baffles 103 and 103' and the longitudinal edges of plates 97, 97', 97a and 97b is a buoyant paddle 113 of low mass, the paddle extending diametrically of the cylindrical container. The paddle is generally in the form of an elongated hollow member with the ends sealed. The paddle of the instant embodiment is shown as being formed of two aligned hollow cylinders 114 with their outer ends sealed by threaded caps 115. The inner adjacent ends of reduced diameter of cylinders 114 are each threaded as at 115' into opposite ends of a central hollow oblong paddle mount 116'.

However, a paddle of any structural shape or configuration may be employed according to the invention, so long as the mass of the paddle in the liquid is maintained small according to the invention. Theoretically, it is not necessary for the paddle to have any apparent mass when submerged in the liquid; i. e., it may be completely buoyant; all that is required is that it be structurally rigid. The paddle may be constructed of any material conferring the foregoing mass characteristics on the paddle, such as magnesium, aluminum, plastic and the like. The reason for this is that the liquid inertial mass, as will be more clearly seen hereinafter, serves as the rotor.

The outer edges of the paddle 113 may touch the adjacent wall sections 93 so long as the paddle is free to rotate over the wall. However, this will reduce the resolution of the instrument, and it will not respond to as low values of acceleration change as when such end gaps are provided.

The paddle 113 is mounted on a leaf spring type Cardan suspension so as to pivot on the central axis of the container 79 and of the paddle mount. The pivot mounting shown in Figs. 14 and 15 consists of angularly faced brackets 95 and 95a. Secured to the angular faces of the brackets by means of clamps 117 (see Fig. 13) and bolts 118 passing through them is a V-shaped spring 119 (see Fig. 17) having a planar base 120, the angles formed by the legs 119 of the V and the base being equal. The base of the spring is connected by a screw 122 to the central hub 123 of the paddle mount 116' so as to put the axis of the paddle on a line passing through the diameter of the cylindrical container. The paddle 113 can thus pivot about the central axis of the container and paddle mount on the spring 119.

The hub 123 of the paddle has a symmetrical boss 123' on opposite sides of the hub, and a screw 122' of the same weight and contour as screw 122 is fastened to the opposite side of the hub. This hub structure makes the paddle completely symmetrical, that is, the paddle is completely balanced in weight and is symmetrical in form about a longitudinal axis through the central axis of the cylindrical paddle and also about an axis perpendicular thereto and passing through the paddle pivot point 124', which is substantially at the intersection of the legs 121 of spring 119.

Connected to opposite corners of the plate 95' are two brackets 124 and 124'. Mounted on each of the brackets 124 and 124' are leaf springs 125 and 125' which extend parallel to each other and to the axis of the paddle 113. Each of the springs carries a block 126 and 126' mounted on the end of the springs 125 and 125'. Each of the blocks 126 and 126' carries an electrically insulated pin 127 and 127', whose centers are aligned on a central axis passing through the pivot axis 124'. Mounted on the hub 123 and spaced equally on both sides of the axis 124' are two insulated pins 129 and 129'. Insulated terminal pins 130', 130'', 131' and 131'' are mounted in blocks 126 and 126'. The pins 130' and 127 and 127' are capped similarly to those in Figs. 1 to 10.

A strain sensitive wire 130 is wound in tension between pins 127' and 129' in a loop, the ends of the loop terminating at and soldered to the cap on pin 127'. A strain wire 131 is also wound in tension between pins 129 and 127' in a loop, both ends of the loop terminating at and soldered to the cap on pin 127'. In the same manner a strain wire 132 is wound in tension in a loop between pins 129' and 127 and terminates at the cap of pin 127. A strain wire 133 is wound in tension in a loop between pins 129 and 127, the ends of the wire terminating at the cap of pin 127. All the pins are electrically insulated and the wires are out of contact with the frame and with each other. The ends of each of the four wire 130, 131, 132 and 133 are respectively connected by slack conductors, such as 134, 135, 136 and 137, terminals 131'' and 131' and 130' and 130'' insulated from block 126' and from block 126, and these terminals in turn are connected by conductors (not shown) to terminals 138 (see Fig. 15) extending through bottom 80 of the device. The latter terminals are connected in a conventional Wheatstone bridge arrangement to the four outer terminals 139 located on the periphery of flange 82. The original tension in each of the wire loops 130, 131, 132 and 133 may be made equal, not more, and for safety is made less, than one-half the design limit of stress, i. e., the ultimate stress, yield point, or proportionality limit chosen. The design limit is chosen as described in connection with the form of Figs. 1 to 10. The paddle is maintained in its central position when the case is at rest or in uniform translation or rotation, i. e., when not accelerated.

The case or container 79 may be completely filled with liquid through a fill hole stoppered by a screw 140 (see Fig. 16) and the fluid enters and fills the chamber 141 between the bottom and top members 80 and 81 of the device, and passes into and fills the chamber 142 underneath the diaphragm 92 through ports 143. Suitable air breather holes 144 are provided in the flange 91.

The details and properties of the accelerometer described in connection with the above Figs. 14 to 17 are the subject matter of co-pending applications Serial No. 431,764, filed May 24, 1954, and Serial No. 328,416, filed December 29, 1952, of which this application is a continuation in part.

The transducer of my invention may be used to determine the relative angular displacement of the paddle 113 resulting from the relative motion of the liquid and the case in angular acceleration of the case and illustrates one application of the transducer of my invention forming the subject matter of this application.

An acceleration of the case in a clockwise direction will cause the paddle to rotate counterclockwise about its axis 124' due to the inertia of the liquid which fills the container. Owing to the fact that the wires 132 and 133 are wound with equal tension and make equal angles with the line through pins 127 and 127', as do also wires 130 and 131, pins 129 and 129' being equally spaced from this line, the angular displacement of the pins 129 and 129' result in changes in the strain in wires 130 and 131, which are equal in magnitude but opposite in direction. Thus, the tension in wire 131 is increased by an amount substantially equal to the relaxation in tension occurring in wire 130. The same situation occurs in the wires 132 and 133 which are wound similarly to wires 131 and 130 and with like geometry. The wires 131 and 132 relax in tension in an amount equal to the increase in tension in wires 130 and 133.

It will also be observed that with the strain transference described above, no deflection of the springs 125 and 125' from their original position with the case at rest occurs, since there is no change in force on the springs 125 and 125' on the deflection of the paddle. This condition will occur irrespective of the spring constant of the springs 125 and 125', and in such case, the pins 127 and 127' may be considered as functionally rigidly fixed in the case. This follows from the fact that the forces exerted on the springs 125 and 125' are in each case the sum of the pull resulting from the tension of the wires attached to the spring. If one relaxes in tension by an amount by which the other increases in tension, then the spring will feel no difference on the total pull on the spring. Any inequality in the variation of tension, however, will result in a change in force on the spring in an amount equal to the inequality.

This condition will thus continue until the deflection relaxes the wires 131 and 132 completely. When this condition obtains, as in the previous example illustrated in Figs. 1 to 10, the springs act only and the wires 133 and 130 increase in tension on further deflection of the paddle. However, by limiting the spring constant of the springs 125 and 125' to a low value the increase in tension on the wires resulting from any given degree of angular displacement of the paddle 113, beyond the point where the wires 131 and 132 go slack, will be small and proportional to the spring constant of the spring, as was described in connection with the transducer of the form illustrated in Figs. 1 to 10.

By properly proportioning the spacing of the pins 127 and 127' from each other, and from pins 129 and 129', and by properly choosing the length of the springs 125 and 125', the increase in tension per degree of deflection of the paddle 113 beyond the point where the wires 131 go slack can be made negligibly small. Thus, for example, the spring constant of springs 125 and 125' can be made from 0.01 to 0.001 of that of the wires 130, 131, 132 and 133. In such case a given increase or strain in the wires 131 and 132 requires a deflection of pins 127 and 127' from about 100 to about 1000 times as great as would be necessary if the pins 127 and 127' were in such case rigidly fixed in space.

As will be seen from what has been said previously in connection with the transducer illustrated in Figs. 1 to 10, the output of the transducer illustrated in Figs. 14 to 17 is substantially 100% efficient, employing the definition of efficiency described above.

The application of this type of transducer makes possible the variation of the sensitivity of the instrument, defined as the change in strain in the wires per degree of deflection of the force summing means, i. e., the paddle. Thus, by increasing the included angle between the wire loops 130 and 131, and also between loops 132 and 133, we will decrease the change in strain in the wires per degree of deflection of the paddle. This can be done either by separating the pins 129 and 129' or decreasing the separation between pins 129 and 129' and the axis of rotation of the paddle 113, or by both means. In like manner the included angle may be made smaller so as to cause the wire loops to approach parallelism by either separating the pins 127 and 127' from the axis of rotation 124' or by bringing the pins 129 and 129' closer together, or by both means. Where the restoring force on the paddle is in large part the change in tension of the wires, the spring rate of the Cardan suspension being made but a small fraction of the spring rate of the wires, this control of the included angle between the wires provides a means for adjusting the range and also the natural frequency of the accelerometer.

As in the case of the transducer of Figs. 1 to 10, I may employ only two active strain wires by omitting the wire loops 130 and 131 and the spring 125 and block 124. I may in place of wires 131 and 130 employ fixed resistances to complete the Wheatstone bridge. As in the case of all such transducers, by employing only two active arms, the voltage output of the bridge per volt input per unit deflection of the force summing means is half of that to be expected where all four arms of the Wheatstone bridge are active strain wires whose tension varies on deflection of the force summing means.

Figs. 18 to 21 show a modification of the transducer illustrated in Figs. 14 to 17, inclusive, which partakes also of some of the properties of the form of Figs. 1 to 10 in that one of the wires is connected to a point fixed in the case, but also has some of the properties of the transducers of Figs. 14 to 17. As will be seen below, the strain wires are connected to the force summing means and also to a point so that there is a relative displacement of the ends of the wires. The wires are also connected to a spring, as in the case of the form of Figs. 13 to 17. An additional similarity exists in that the force summing means may be applied through a linkage system in which a mechanical advantage is obtained, to permit of a deflection of the pin mounting connected to the force summing means, which deflection will be different from the deflection of the force summing means at the point where the force causing the deflection is applied to the force summing means.

Referring to Fig. 18, blocks 202 and 203 are mounted on frame base 201 and carry the Cardan suspension spring 205 similar to the Cardan spring of Fig. 14 but carrying legs 205' which may be clamped or bolted to blocks 202 and 203. The block 207 is mounted in the Cardan suspension by means of clamping block 206. Blocks 209 and 210 mounted on base 201 carry bores 211 and 211' in which are mounted insulated terminals 212 similarly constructed to the terminal 45 illustrated in Fig. 4. The rods 213 and 213' passing through the insulating glass balls 212 and 212' extend beyond the block 210 and 209 respectively. To the ends of the rods are spot welded two leaf springs 214 and 214' so that they extend in coplanar fashion parallel to the block 207 and the axis arm 207'. Each of the springs carries a hook 215 and 215' spot welded to the ends of the springs.

Mounted on the block 207 is an insulating pin 217 carrying a metallic cap 217'. The pin is mounted off-center for reasons given below. The block 207 also carries two additional insulation pins 216 and 216' capped similarly to cap 217'. Wire or wire loops are wound about the pins so that the end of one wire 221 is soldered to cap 216' and wound about and soldered to hook 215 and another wire 218 is soldered to cap 216 and wound about and soldered to hook 215. The wires 219 and 220 extending from hooks 215 and 215' are joined and soldered to the same side of the cap 217' at point 222. The pin 217 is preferably so located that the point 222 is substantially on the axis of rotation of the block 207 upon the Cardan suspension. The points of attachment of the wires 221 to cap 216' and of wire 218 to cap 216 are preferably in line with and equally spaced from 222. The hook 215 is preferably aligned on the bisector of the angle between 221 and 220, and the hook 215' is preferably also aligned on the bisector of the angle between wires 218 and 219. The wires are wound with an included angle as described in connection with the previous forms. Thus, the angle may be made as small as desired or made large depending on the sensitivity and range and natural frequency desired in the same manner as described in connection with the form illustrated in Figs. 11 to 17. Thus, the ratio of the separation of the points of attachment of the wire to caps 217' and to 216 and 216', to the distance of the hooks 215 and 215' from these caps, may be changed and the diameter of the hooks 215 and 215' may be changed to adjust the magnitude of the included angle from approximately parallel to any desired angularity, preferably less than 180°, with results similar to that described for the forms illustrated in the previous figures. The wires are all of equal length wound under equal tension, or the wires 219 and 221 may be wound in equal tension which is different from that of the wires 218 and 220 which are wound in equal tension. That is, the initial tension and distribution of initial tension may be similar to that described for the wires 50 and 51, and 50' and 51', in the form illustrated in Figs. 1 to 10.

The cap 223 is mounted on base 201 by means of screws 225 passing through flange 224. The rod 207' is shown as passing through a hole 208 in order that it may be connected to any system for measurement of displacement or force. The opening 208 is not necessarily designed as a stop to limit the motion of the rod 207'. Mounted on the top of the case is a terminal plate 225' carrying four terminals 226 insulated from the case for connection to caps 222, 216, 216' and terminals 213 and 213' in a conventional Wheatstone bridge arrangement. It is to be noted that the metallic leaf springs and hook provide the electrical connection between the wires 221 and 220 and terminal 213 and between wires 219 and 218 and terminal 213'.

It will be seen that the displacement of the rod 207' will cause a rotation of the block 207 and cause the pins 216 and 216' to be displaced while the point 222 will remain fixed in the case. Thus, for example, in a clockwise rotation of the block 207, wires 221 and 219 will be relaxed in tension while wires 220 and 218 will be increased in tension. However, in contradistinction to the form of Figs. 13 to 17, and similarly to the wires 50 and 51 of the form of Figs. 1 to 10, the wires are relaxed in tension differently from the increase in tension of the companion wires depending on the ratio of the spring constant of the springs 214 and 214' to the spring constant of the wires, as was explained in connection with the system of Figs. 1 to 10. The efficiency of the bridge system will thus depend on the same considerations as described for the system of Figs. 1 to 10.

For the reasons given in connection with the systems of Figs. 1 to 10, and also 13 to 17, when the wires 221 and 219 become slack, any further motion of the rod 207' will impose an added tension on wire 218 but not wire 220, which will be limited by the limited value of the spring constant of the spring 214' for the same reasons as was described in connection with the springs of the forms previously described.

In the forms illustrated in Figs. 1 to 10 and 18 to 21, the restraint imposed on the wires in the form of a spring which, although may be made to have a low spring constant in proportion to that of the electrical strain wires, for example 0.01 to 0.001 thereof, yet it has a finite value, and this value reduces the total electrical output available from the system.

While I have described the forms of Figs. 1 to 10 and Figs. 18 to 21 in which each pair of wires is connected to a separate spring, I may modify the construction of Figs. 1 to 10 and 18 to 21 by employing a single spring and connecting each pair of the wires to be connected into a Wheatstone bridge arrangement by connecting them to a single spring. In all other respects the structure of Figs. 1 to 10 remains the same. Thus, in the form shown in Figs. 1 to 10, the springs 48 and 48' may be combined into a single spring 48a (see Fig. 28) carrying at its upper end a support 49a for two axially aligned insulating pins 49b and 49c whose axis is parallel to the plane of the spring 49a. Instead of two slots 44 and 44', as in Figs. 1 and 2, I position one slot 41a (see Fig. 28) on the center line of the bracket 15 of Figs. 1 and 2. The insulator 45a, similar in construction to 45 of Figs. 1 and 2, is mounted in the slot 41a in like manner, and the spring 48a is mounted in the plate extension 46b of the insulator rod 46a by spot welding it to the plate 46b, which is formed integrally with the rod 46a of the insulator. The plane of the spring 48a, like that of the springs 48 and 48' of Figs. 1 and 2, is perpendicular to the plane passing through the axis of each pair of wires 50 and 51, and also 50' and 51'. The size of the leaf spring is chosen to compensate for the increased pull on the spring due to the application of four wires instead of two wires, as in the form of Figs. 1 to 10. The wires 50 and 51 are then wound about and secured to the metallic caps 38a of the pins 49b and also to wires 50' and 51' are wound about and secured to the cap 38b of pin 49c. The spacing of the wires and of the caps should be preferably such that the included angles between the wires is as small as possible, and ideally, as in the forms of Figs. 1 to 10 that all of the wires be parallel to each other, and as described above the wires may be wound with equal tension, each equal to less than one-half of the tensile stress of the wires, or the wires of each pair wound with unequal tension, the sum of the tensions of the wires in each pair being equal, and the tensions in the wires 50 and 50' being equal, as are the tensions in the wires 51 and 51' and the sum of the tensions in wires 50 and 51, and also the sum of the tensions in the wires 50' and 51' being less than the ultimate tensile stress or the proportionality limit, whatever design criteria is chosen. By so choosing the tensions and the included angles, the net stress imposed on the wires 50 and 51, and also 50' and 51', is perpendicular to the plane of the spring 48a, and the net stress imposed by the wires 50' and 51' may be equalized with that of wires 50 and 51, so that no moment is imposed on the spring to deflect the spring about a longitudinal axis of the spring 48a.

The caps 38a and 38b are connected to electrical leads 38d, as in the case of the forms of Figs. 1 to 10, in order to permit the wires to be connected into a Wheatstone bridge arrangement.

In like manner, the form illustrated in Fig. 18 may be modified as shown in Fig. 31 by omitting one of the springs and its mounting, for example, spring 214 and block 210, and employing only spring 214' and mounting 209. The hook 215' is modified to carry two insulating pins 215a and 215b, on which metallic caps 216 are mounted. The wires 218, 219, 220 and 221 are connected to the caps in the same manner as to the hooks 215 and 215' in the form of Fig. 18, and the caps are of a diameter and positioned, when at rest, with respect to the wires as in the form of Fig. 18. In all other respects the transducer remains unchanged.

However, by removing the spring and replacing it with a yieldable constraining means which has zero spring constant, we may cause a complete transfer of the strain variation in one wire of the pair to the second wire of the pair in the system, where one of the wires of the pair is attached to a point fixed in space. In addition, since the total constraining force is made constant and independent substantially of the displacement of the constraining means, none of the wires may thus be strained in tension in an amount in excess of the said constraining force. This may be designed so as not to exceed the tensile strength, elastic limit, or the proportionality limit of the wire, as desired.

Such a constraining force may be a weight attached of such magnitude so that it imparts a maximum stretch in each wire which is not in excess of the aforesaid limits. Since the weight, i. e., mass, is a constant irrespective of the displacement of the mass, where acceleration forces may be ignored, the proportionality between the constraining force and the displacement of the mass, which may be visualized as the spring constant of the constraining force of the mass, may be taken mathematically as zero.

$$dF = kdx = 0 \qquad \text{(Equation 5)}$$

where $dF$ is the change in the constraining force upon any displacement $dx$ of the constraining means, and $k$ is the spring constant.

Such a device is illustrated in Figs. 22 and 23.

The frame composed of two legs 301 and 302 is mounted on base 303 by means of screws 304. A ring 305 is mounted on the legs 301 and 302 by means of screws 306. On the inner wall of the leg 302 is mounted a spring block 307 constructed similar to block 23 shown in Fig. 5. The leg 308 is connected to the leg 302 by means of screws 309 and 309'. The leg 310 is connected to the leg 308 by means of the leaf spring 311 milled from the block, as was described in connection with Fig. 5.

Mounted on base 303 is a hollow cylinder 311' attached to the base 303 by means of screws 312. A cylindrical weight 313 carrying end flanges 314 is positioned in the cylinder 311' from the walls thereof. The end flanges are curved at their peripheral surface, in order to limit the area of contact of the weight with the cylinder 311'. The cylinder may be lubricated to reduce friction.

The weight is connected by a rod 315' to a stem 315 and the rod passes freely through a cap 316 which closes the cylinder.

Mounted on the ring 305 is a diaphragm 319 which closes the opening of the ring and is spot welded at its periphery to the ring 305 to make a fluid-tight joint. A stem 320 is connected to the diaphragm 319.

Insulating pins 317 carrying caps 318 and 318' (similar to the pins shown in Fig. 10) pass through the stem 315 axially aligned with the axis of the weight 313 and cylinder 311'. A similar pin 321 and cap assembly 322 and 322' is mounted in stem 320, and a similar pin 323 and cap assembly 324 and 324' is mounted in the leg 307.

The wire 326 is wound about and soldered to the cap 322, and wire 325 extends to and is wound about and soldered to the cap 324, and both wires 325 and 326 extend in tension to and are soldered to cap 318. An additional pair of wires 325' and 326' is similarly wound about and mounted on caps 318', and caps 322' and 324'. Instead of single wires it may employ wire loops, such as are illustrated in Fig. 14.

The axis of the pin 321, which is on the axis of the weight 313 and cylinder 311', is in the plane which bisects the angles made between wires 325 and 326, and also between the similar pair 325' and 326', whose geometry is the same as that of wires 325 and 326. As in the previous form, all of the wires may be made of the same length and equal in tension, each less than one-half of the tension at the design limit, as described previously. The tension in the wires of each pair may be unequal, with the sum of the tensions of the wires of each pair equal to that of the other pair and less than the design limit, as described above, the tensions in the wires 325 and 325' being equal, and the tensions in wires 326 and 326' being equal.

The pins are so spaced, the diameter of the caps are so chosen, and the points of attachment of the wires are so selected as to give the desired value to the included angle.

With the frame in vertical position the weight 313 is thus supported on the four wires 325, 326, 325' and 326' via rod 315'. The resulting tension on wires 325 and 326' may be equal to or greater than that in 325 and 325' depending on the adjustment of the set screw 309'. By adjustment of the screw 309' the pin 323 may be moved clockwise or counter-clockwise about the flexure point in spring 311 and thus the ratios of the stresses in 325 and 326, and also in 325' and 326', may be adjusted without introducing any moment in the weight 313 due to the suspension of the weight on the rod 315'. The weight is thus suspended in the cylinder 311' with all external surfaces of the weight free of the walls of the cylinder 311'. The cylinder is thus axially displaced from the center line of the stem 320 for this purpose.

While the included angle between the wires 325 and 326 and between 325' and 326' may be varied from parallelism of the wires to less than 180°, as described above in connection with the form shown in the previous figures, however, in this form I prefer to make the wires 325 and 326 as close to parallel as is mechanically feasible. The wires or wire loops 325 and 326, and also 325' and 326', are wound so that the axes of the wires are coplanar. The tensions in the wires of each pair of wires may thus be initially adjusted in the same manner as described in the previous forms, i. e., either equal or unequal with the sum of the tensions of the wires in each pair not in excess, and preferably less than the design limit so that a decrease in tension of one of the wires would not cause the companion wire to be stressed beyond the design limit.

As was described in connection with the forms of Figs. 1 to 10, the pin 323 may be considered fixed in space, since due not only to the comparatively high value of the spring constant of the flexure 311 but also because of the back-up of the set screw, which may be made sufficiently rigid, so that the variation in tension in the wires will cause no substantial deflection of the flexure 311.

The frame is mounted in the case 327, provided with a bore 328 covered with a terminal plate 329 carrying four insulated terminals 330 to which the caps 318, 318', 322, 322', 324 and 324' are electrically connected in the conventional Wheatstone bridge arrangement. The case is closed by a closure 331 carrying a flange 333 which seats on flange 332 in case 327 and secured by bolts 334.

A pressure-tight seal is made by O-ring 335 set in groove 336. A central bore 337 is provided in closure 331.

It will be observed that the initial strain of the wires is solely dependent on the weight 313, as is the sum of the strains in the wires of each pair during any deflection of the force summing means. Thus, for example, when the tension in the wires is all initially equal, each of the wires of each pair bears one-quarter of the weight, and thus the initial strain in each of the wires may be, by a proper choice of the weight, equal to one-half of the design limit of strain to be imposed on the wires. In like manner, the tensions in the wires 325 and 326, as well as in the pair of wires 325' and 326' may be adjusted to be unequal by adjustment of the screw 309'. It will be seen that as the stem 320 moves towards the weight to reduce the strain in the wires 326 and 326' the strain is transmitted to the other wires 325 and 325'. It will also be seen that only the total of the original strain in wires 326 and 326' can be transmitted to wires 325 and 325' since then the wires 326 and 326' go slack. Since the weight 313 is supported entirely on wires 325 and 325', which thus each carry one-half of the weight, the strain in wires 325 and 325' cannot exceed the safe limit chosen and imposed by the weight. The reverse condition occurs when the stem 320 moves away from the weight, as when the gauge acts as a vacuum gauge and the wires 326 and 326' are further stressed while the stress in wires 325 and 325' is relaxed.

Additionally, by properly spacing the bottom of the weight 313 from the plate 303, the weight may be made to touch bottom when the total strain in wire 325 has reached the chosen design limit, which may be as desired the ultimate tensile stress or the stress at the proportionality limit of wire 325.

The reduction in tensile stress in one pair of the wires is equalled by the increase in stress in the other two wires, since the total stress in all four of the wires must at all times be equal to the gravitational pull of the weight.

The output of such a transducer is thus 100%, as will be understood from the foregoing discussion.

Where the device is to remain stationary, as for example where it is to be positioned in a fixed vertical position, the guide 311' may be omitted.

Where the device is to be used as a pressure transducer, for example, to measure barometric pressure, the rod may be connected to a diaphragm, as is illustrated in Fig. 19, and the bore 337 exposed to atmospheric pressure, while the case 327 may be either evacuated or subjected to amibent pressure, if a different pressure is to be supplied to bore 337. By fixing the device vertically, the device will act as a pressure gauge. Where the pressure changes, as in the case of a barometer, with low frequency, the changes in pressure will cause but an insignificant rate of change in the stress in the wire and an insignificant acceleration of the mass, and thus the net stress will be substantially equal to that of the mass when at rest.

Instead of using a mechanical spring or a weight to act as the yieldable constraining means, I may use any other yieldable constraining means, which in analogy to the weight and the mechanical spring, may be said to have a spring constant. Thus, instead of the spring or weight I may employ of magnet where pole pieces are separated by a gap. Since the attraction between the pole pieces is, without saturation in the magnetic circuit, a function of the separation between the pole pieces, a pair of magnetic pole pieces may be visualized as if the magnetic attraction between them is a spring, and this factor may be said to be the magnetic spring rate which may be considered constant over the small displacement with which we are here concerned. Thus, in place of the spring 48 of Figs. 1 to 10, or the weight of Fig. 19 in the transducer, I may introduce a pair of magnets. Such a device is illustrated in Figs. 25 to 27.

The device as illustrated in Fig. 25 is in all respects, except as is described below, similarly constructed and wires wound and tensioned as is shown in the device of Figs 22 to 24, all similar parts having the same structure and function and similarly numbered.

The difference in construction is in the following feature. The base 401 may be, but need not necessarily be, made of a non-magnetic metal or plastic material. The cylinder 402 is also made of non-magnetic material and is mounted on base 401 similar to cylinder 311'. The cylinder is covered by a cover 403 of non-magnetic material. The permanent cylindrical magnet 404 is fixed in cylinder 402. The permanent cylindrical magnet 405, which is made to have as little weight as is convenient, is freely and centrally positioned in the cylinder 402. It carries lands 402' which may be of non-magnetic material to limit the area of contact with the wall. It is connected at its central point to the stem 406, similarly constructed and positioned as is stem 315 of Fig. 22. The magnets are so magnetized that the opposing faces 404' and 405' are of opposite polarity. The magnet 405 may be chosen to be saturated at the field strengths employed, in which case it is desirable that the cylinder 402 be made of a magnetic material of low permeability, and that the gap between the peripheral face of cylinder 405 and cylinder 402 be made as small as possible. Such materials are well known to those skilled in this art. There is thus provided an air gap 407 which varies in length but is constant in area on displacement in the cylinder 405, the gap between the peripheral edge of the cylinder 405 and cylinder 402 remaining constant. Preferably, the magnetic circuit is such that small changes in the gap between the two magnets does not alter the force of attraction between the two magnets in a substantial degree. This is aided by the use of a saturated magnetic path, as for example, by the use of a magnetically saturated pole piece 405 sufficient to saturate the gap. In such cases the attractive force is substantially constant. If no saturation is present in the magnetic path the force of attraction over the small gap variations occurring is substantially a linear function of the displacement of the pole piece 405 throughout the deflection of the force summing means for which the instrument is designed, considering that these displacements, as are employed in conventional strain gauges of the prior art, are of the order of micro-inches, as described above.

Thus, if the force summing means is deflected towards the magnets, the pole pieces approach each other, the reduction in strain in wires 326 and 326' is transferred to the wires 325 and 325', and results in an increase in strain in wires 325 and 325'. If the attractive force between the magnets remains constant during this motion, the magnets act in a mathematical sense like a constraining force of zero spring constant and the electrical efficiency of the bridge circuit is 100%, as described above. However, if the attractive force increases in a linear manner, as the magnets approach each other, the magnets act like a constraining force of positive spring constant and the transfer of stress will be less than 100%, and the electrical efficiency of the bridge circuit less than 100%, depending on the magnitude of the magnetic spring constant.

By properly spacing the initial gap between the pole pieces, the pole pieces can be made to come into contact when the wires 325 and 325' have been strained to the desired limit, to wit, its ultimate tensile stress or the stress at the proportionality limit of the wires 325 and 325'.

Conversely, for example, if the gauge is used as a vacuum gauge, with ambient pressure inside the case under the diaphragm, a deflection of the force summing means away from the magnets causes an increase in the gap 407. The wires 326 and 326' increase in stress while the wires 325 and 325' decrease in stress. The character of the strain transfer for like conditions of the magnets and magnetic circuit and wiring is the same as described above over a properly limited range of gap increase, as will be clear from the foregoing.

While for such limited displacements, the variation of force of attraction with gap separation may in a practical manner be taken practically linear, the mathematical law of variation of force in a non-saturated magnetic path with gap variation is that this force decreases as the square of the gap length, the area remaining constant. Thus, a doubling of the gap length reduces the force to a fourth of the force present with the original gap. The deviation from linearity increases as the gap increases and the increase in tension in wires 326 and 326' on continued displacement of the force summing becomes increasingly less, this increase in tension varying as the square root of the gap. Thus, the attractive force between the magnets becomes rapidly less and the magnets may thus be designed that as the tension in wires 326 and 326' approaches the safe upper limit as designed, the gap will be increased in amount so that the tension in wires 325, 325', and also 326 and 326', will decrease on further movement of the force summing means. Thus, the design limits of stress are not exceeded, irrespective of the motion of the force summing means.

When the forces imposed on the force summing means are removed the magnets reset themselves to the original design position.

The initial value of the attractive force may be made a limiting value on the tension on the wires.

It will also be observed that by proper choice of the pole strength of the magnets and the air gap between them, it is possible to impose a strain in wires 325, 325', 326 and 326', which may be of the same character and proportion as described in connection with that shown in Fig. 22, the weight of the piece 405 having but a negligible influence; in fact, can be completely disregarded. The instrument need not be used in an erect position but may be in a horizontal position. The magnets may thus act in the same way as the weight as a constraining force of zero spring constant, and the properties of the device of Figs. 25 to 27 are similar to those of Figs. 22 to 24, making the same provisions for a substantially axially rigid wire connection, such as wire 315', as in the case of the form employing the weight.

As was explained in connection with the device of Fig. 22, the device of Fig. 25 will show substantially 100% of output efficiency, ignoring friction forces which may be held to a minimum, as described in connection with the form shown in Fig. 22.

The magnetic spring described in connection with the forms illustrated in Figs. 25 to 27 may also be used in the forms illustrated in Figs. 1 to 12, Figs. 13 to 17, Figs. 18 to 21, and Figs. 28 to 30. Thus, for example, the springs 48 and 48' in the form of Figs. 1 to 12, and the springs 125 and 125' of the form of Figs. 13 to 17, and the springs 214 and 214' of Figs. 18 to 21, may be replaced by a magnetic spring. Thus, as is illustrated in Figs. 1 to 10, the springs may be replaced by the magnetic springs of Figs. 33 to 35. In like manner the form illustrated in Figs. 13 to 21 may be modified by removing the springs and then mounting and replacing each of the springs with a magnetic spring of the form described in connection with the form of Figs. 33 to 35. Thus, each of the springs and their mountings are removed and a non-magnetic bracket 501 and cylinder 502 of the same material as described in connection with cylinder 402 of Fig. 25 are mounted on plate 95' of Fig. 13 or the base of Fig. 18. A pair of pole pieces 504 and 504' similar to pole piece 405 is similarly mounted in the cylinder. The axes of each of the sets of magnetic pole pieces in each cylinder are axially aligned with the bisector of the angles of the pair of electrical resistance wires 505 and 506, there being two such pairs of wires corresponding to wires 130, 131, 132 and 133 of Fig. 13, or to wires 218, 219, 220 and 221 of Fig. 18. The wires are wound around and soldered to metallic caps 50 mounted on insulating pins 502' set in the offset bracket 509 connected to pole pieces 504, preferably in such manner that the wires on the pin have their axes in a plane passing through the axis of the cylindrical pole piece, and the bisector of the angle between the wires is in the same axis, so that no moment is created above that axis. The tensioning of the wires may be made similarly to that described for the wires of form Figs. 13 to 17, or of Figs. 18 to 21, whichever form is used. The terminal leads on the form of Fig. 13 instead of being taken by slack wires to terminals 139 and 130' may be made by connecting the wires 518.

While I have described a particular embodiment of my invention for the purpose of illustration, it should be understood that various modifications and adaptations thereof may be made within the spirit of the invention as set forth in the appended claims.

I claim:

1. An electrical resistance strain wire transducer, comprising: a movable force summing means, a first wire support, a motion transmitting connection between said force summing means and said wire support, a second wire support, a third wire support, a yieldable constraining means connected to said second wire support, a pair of electrical resistance strain wires, one of the wires of said pair connected to and extending in tension between the first and second wire supports and the second strain wire of said pair connected to and extending in tension between the second and third support, and means for displacing the first support relative to the third support on movement of said force summing means, whereby one of said wires increases in tension while the other of said wires decreases in tension on said displacement of said force summing means.

2. A transducer according to claim 1, wherein the spring constant of said constraining means is less than the spring constant of said wires.

3. An electrical resistance strain wire transducer, comprising: a movable force summing means, a first wire support, a motion transmitting connection between said force summing means and said wire support, a second wire support, a third wire support, a yieldable constraining means connected to said second wire support, a pair of electrical resistance strain wires, one of the wires of said pair connected to and extending in tension between the first and second wire supports and the second strain wire of said pair connected to and extending in tension between the second and third support, the sum of the tensions in the wires being less than the ultimate tensile stress of the wires, and means for displacing the first support relative to the third support on movement of said force summing means, whereby one of said wires increases in tension while the other of said wires decreases in tension on said displacement of said force summing means.

4. An electrical resistance strain wire transducer comprising: a movable force summing means, a first wire support, a motion transmitting connection between said force summing means and said first support, a movably supported second wire support, a third support, a yieldable constraining means connected to said second support, a pair of electrical strain wires extending in tension between the first and second support, a second pair of wires extending in tension between the second and third support, means for displacing the first support relative to the third support, and including means to displace the second support relative to the third support and against the constraint of said constraining means whereby the tension in each of the wires of one of said pairs is increased while the tension in each of the wires in the other pair is decreased on displacement of the force summing means, and electrical connections between said wires adapted to connect said pairs into a Wheatstone bridge.

5. A transducer according to claim 4, wherein the spring constant of said constraining means is less than the spring constant of said wires.

6. An electrical resistance strain wire transducer comprising: a movable force summing means, a first wire support, a motion transmitting connection between said force summing means and said first support, a second wire support, a third support, a yieldable constraining means connected to said second support, a pair of electrical strain wires extending in tension between the first and second support, a second pair of wires extending in tension between the second and third support, means for displacing the first support relative to the third support, whereby the tension in each of the wires of one of said pairs is increased while the tension in each of the wires in the other pair is decreased on displacement of the force summing means, the sum of the tensions in each pair of wires being equal and less than the ultimate tensile stress, and the tension in the wires which change in the same direction on motion of the force summing means being equal, and electrical connections between said wires adapted to connect said pairs into a Wheatstone bridge.

7. An electrical resistance strain wire transducer comprising: a movable force summing means, a first wire support, a motion transmitting connection between said force summing means and said first wire support, a frame, a second wire support mounted on said frame, a third wire support, a spring mounted on said frame, a mechanical connection between said spring and said second wire support, a pair of electrical resistance strain wires, one of the wires of said pair connected to and extending in tension between the first and second wire supports and the second strain wire of said pair connected to and extending in tension between the second and third support, and means for displacing the first support relative to the third support on movement of said force summing means, whereby one of said wires increases in tension while the other of said wires decreases in tension on said displacement of said force summing means.

8. A transducer according to claim 7, wherein the spring constant of said spring is less than the spring constant of said wires.

9. An electrical resistance strain wire transducer according to claim 7, in which the second wire support is rigidly mounted on said frame.

10. An electrical resistance strain wire transducer according to claim 9, in which the spring constant of said spring is less than the spring constant of said wire.

11. An electrical resistance strain wire transducer according to claim 10, in which the spring constant of said spring is from about 0.1 to zero times the spring constant of the wires.

12. An electrical resistance strain wire transducer according to claim 11, in which the spring constant of said spring is from about 0.001 to about 0.01 times the spring constant of the wires.

13. An electrical resistance strain wire transducer according to claim 7, in which the second support is rigidly mounted on said frame and the electrical resistance strain wires in said pair are equally tensioned, and the sum of the tensile stresses in the wires of said pair is less than the ultimate tensile stress of the wires.

14. An electrical resistance strain wire transducer according to claim 13, in which the spring constant of said spring is less than the spring constant of said wires.

15. An electrical resistance strain wire transducer according to claim 14, in which the spring rate of the spring is from about 0.01 to zero times the spring constant of the wires.

16. An electrical resistance strain wire transducer according to claim 15, in which the spring rate of the spring is about 0.01 to about 0.001 times the spring constant of the wires.

17. An electrical resistance strain wire transducer comprising: a movable force summing means, a first wire support, a motion transmitting connection between said force summing means and said first wire support, a frame, a second wire support mounted on said frame, a third wire support, a spring mounted on said frame, a mechanical connection between said spring and said second wire support, a pair of electrical resistance strain wires, one of the wires of said pair connected to and extending in tension between the first and second wire supports and the second strain wire of said pair connected to and extending in tension between the second and third support, the sum of the tensions in said wires being less than the ultimate tensile stress, and means for displacing the first support relative to the third support on movement of said force summing means, whereby one of said wires increases in tension while the other of said wires decreases in tension on said displacement of said force summing means.

18. An electrical resistance strain wire transducer, comprising: a movable force summing means, a first wire support, a motion transmitting connection between said force summing means and said first wire support, a frame, a second wire support mounted on said frame, a third wire support, a spring mounted on said frame, a mechanical connection between said spring and said second wire support, a pair of electrical strain wires extending in tension between the first and second support, a second pair of wires extending in tension between the second and third support, means for displacing the first support relative to the third support, whereby the tension in each of the wires of one of said pairs is increased while the tension in each of the wires in the other pair is decreased on displacement of the force summing means, and electrical connections between said wires adapted to connect said pairs into a Wheatstone bridge.

19. A transducer according to claim 18 wherein the spring constant of said spring is less than the spring constant of said wires.

20. An electrical resistance strain wire transducer comprising: a movable force summing means, a first wire support, a motion transmitting connection between said force summing means and said first wire support, a frame, a second wire support mounted on said frame, a third wire support, a spring mounted on said frame, a mechanical connection between said spring and said second wire support, a pair of electrical strain wires extending in tension between the first and third support, a second pair of wires extending in tension between the second and third support, means for displacing the first support relative to the third support, whereby the tension in each of the wires of one of said pairs is increased while the tension in each of the wires in the other pair is decreased on displacement of the force summing means, the sum of the tensions in each pair of wires being equal and less than the ultimate tensile stress, and the tension in the wires which change in the same direction on motion of the force summing means being equal, and electrical connections between said wires adapted to connect said pairs into a Wheatstone bridge.

21. An electrical strain wire transducer, comprising: a movable force summing means, a first wire support, a motion transmitting connection between said force summing means and said first wire support, a frame, a second wire support mounted on said frame, means to hold the second wire support relatively immovable on said frame on motion of said force summing means, a third wire support, a spring mechanically connected to said frame, a mechanical connection between said third wire support and said spring, said third support being mounted for motion relative to said second support, a pair of electrical resistance strain wires, one of the wires of said pair connected to and extending in tension between the first and third wire supports and the second strain wire of said pair connected to and extending in tension between the second and third support, and means for displacing the first support relative to the second support on movement of said force summing means, whereby one of said wires increases in tension while the other of said wires decreases in tension on said displacement of said force summing means.

22. A transducer according to claim 21, wherein the spring constant of said spring is less than the spring constant of said wires.

23. An electrical strain wire transducer, comprising: a movable force summing means, a first wire support, a motion transmitting connection between said force summing means and said first wire support, a frame, a second wire support mounted on said frame, means to hold the second wire support relatively immovable on said frame on motion of said force summing means, a third wire support, a spring mechanically connected to said frame, a mechanical connection between said third wire support and said spring, said third support being movably mounted on said spring for motion relative to said first and second supports, a pair of electrical resistance strain wires, one of the wires of said pair connected to and extending in tension between the first and third wire supports and the second strain wire of said pair connected to and extending in tension between the second and third support, the sum of the tensions in each pair of wires being equal and less than the ultimate tensile stress, and the tension in the wires which change in the same direction on motion of the force summing means being equal, and means for displacing the first support relative to the second support on movement of said force summing means, whereby one of said wires increases in tension while the other of said wires decreases in tension on said displacement of said force summing means.

24. An electrical resistance strain wire transducer, comprising: a movable force summing means, a first wire support, a motion transmitting connection between said force summing means and said wire support, a frame, a second wire support, means to hold said second wire support relatively immovable on said frame on motion of said force summing means, a third wire support, a spring mounted on said frame, a mechanical connection between said spring and said third support, a pair of electrical strain wires extending in tension between the first and third support, a second pair of wires extending in tension between the second and third support, means for displacing the first support relative to the second support, whereby the tension in each of the wires of one of said pairs is increased while the tension in each of the wires in the other pair is decreased on displacement of the force summing means, and electrical connections between said wires adapted to connect said pairs into a Wheatstone bridge.

25. A transducer according to claim 24, wherein the spring constant of said spring is less than the spring constant of said wires.

26. An electrical resistance strain wire transducer, comprising: a movable force summing means, a first wire support, a motion transmitting connection between said force summing means and said wire support, a frame, a second wire support, means to hold said second wire support relatively immovable on said frame on motion of said force summing means, a third wire support, a spring mounted on said frame, a mechanical connection between said spring and said third support, a pair of electrical strain wires extending in tension between the first and third support, a second pair of wires extending in tension between the second and third support, means for displacing the first support relative to the second support, whereby the tension in each of the wires of one of said pairs is increased while the tension in each of the wires in the other pair is decreased on displacement of the force summing means, the sum of the tensions in each pair of wires being equal and less than the ultimate tensile stress, and the tension in the wires which change in the same direction on motion of the force summing means being equal, and electrical connections between said wires adapted to connect said pairs into a Wheatstone bridge.

27. An electrical strain wire transducer, comprising: a frame, a movable force summing means including a lever mounted on said frame for rotation about an axis on said frame, a first wire support, a motion transmitting connection between said force summing means and said first wire support, a second wire support mounted on said lever adjacent to said axis, means to hold the second wire support relatively immovable on said frame on motion of said lever, a third wire support, a yieldable constraining means connected to said third wire support and to said frame, a pair of electrical resistance strain wires, one of the wires of said pair connected to and extending in tension between the first and third wire supports and the second strain wires of said pair connected to and extending in tension between the second and third support, said force summing means displacing the said first support relative to the second support on movement of said force summing means, whereby one of said wires increases in tension while the other of said wires decreases in tension on said displacement of said force summing means.

28. A transducer according to claim 27, wherein the spring constant of said constraining means is less than the spring constant of said wires.

29. An electrical strain wire transducer, comprising: a movable force summing means, a first wire support, a motion transmitting connection between said force summing means and said first wire support, a frame, a second wire support mounted on said frame, means to hold the second wire support relatively immovable on said frame on motion of said force summing means, a third wire support, a yieldable constraining means connected to said third wire support, a pair of electrical resistance strain wires, one of the wire of said pair connected to and extending in tension between the first and third wire supports and the second strain wire of said pair connected to and extending in tension between the second and third support, the sum of the tensions in said wires being less than the ultimate tensile stress, and means for displacing the first support relative to the third support on movement of said force summing means, whereby one of said wires increases in tension while the other of said wires decreases in tension on said displacement of said force summing means.

30. An electrical resistance strain wire transducer, comprising: a movable force summing means, a first wire support, a motion transmitting connection between said force summing means and said wire support, a frame, a second wire support, means to hold said second wire support relatively immovable on said frame on motion of said force summing means, a third wire support, a yieldable constraining means connected to said third wire support, a pair of electrical strain wires extending in tension between the first and third support, a second pair of wires extending in tension between the second and third support, means for displacing the first support relative to the second support, whereby the tension in each of the wires of one of said pairs is increased while the tension in each of the wires in the other pair is decreased on displacement of the force summing means, and electrical connections between said wires adapted to connect said pairs into a Wheatstone bridge.

31. A transducer according to claim 30, wherein the spring constant of said constraining means is less than the spring constant of said wires.

32. An electrical resistance strain wire transducer, comprising: a movable force summing means, a first wire support, a motion transmitting connection between said force summing means and said wire support, a frame, a second wire support, means to hold said second wire support relatively immovable on said frame on motion of said force summing means, a third wire support, a yieldable constraining means connected to said second wire support, a pair of electrical strain wires extending in tension between the first and third support, a second pair of wires extending in tension between the second and third support, means for displacing the first support relative to the second support, whereby the tension in each of the wires of one of said pairs is increased while the tension in each of the wires in the other pair is decreased on displacement of the force summing means, the sum of the tensions in each pair of wires being equal and less than the ultimate tensile stress, and the tension in the wires which change in the same direction on motion of the force summing means being equal, and electrical connections between said wires adapted to connect said pairs into a Wheatstone bridge.

33. A strain wire transducer, comprising: a frame, a lever pivotally mounted on said frame for rotation about an axis of rotation, a movable force summing means, a motion transmitting connection between said force summing means and said lever, a first wire support mounted on said lever to one side of the axis, a second wire support mounted on said lever adjacent said axis, a third wire supported mounted on said lever on the other side of said axis, said first and third wire supports being spaced from said axis at substantially equal distances, a fourth wire support, a spring mechanically connected to said frame and said fourth wire support, a fifth wire support, a second spring mechanically connected to said frame and to said fifth wire support, an electrical resistance wire connected to and extending in tension between the first wire support and the said fourth wire support, an electrical resistance strain wire extending in tension between the second wire support and said fourth wire support, an electrical resistance strain wire extending in tension between the second wire support and the fifth wire support, an electrical resistance strain wire extending in tension between the fifth wire support and the third wire support, and means for connecting said wires in a Wheatstone bridge arrangement.

34. A strain wire transducer, comprising: a frame, a lever pivotally mounted on said frame for rotation about an axis of rotation, a movable force summing means, a motion transmitting connection to said lever, whereby said lever pivots on said axis on motion of said force summing means, a first wire support mounted on said lever, a second wire support mounted on said lever and spaced longitudinally from said first wire support, a third wire support, a yieldable constraining means mechanically connected to said third wire support, a pair of electrical resistance strain wires, one of the wires of said pair connected to an extending in the tension between the first and third wire supports and the second strain wire of said pair connected to and extending in tension between the second and third support, whereby one of said wires increases in tension while the other of said wires decreases in tension on displacement of said force summing means.

35. A transducer according to claim 34, wherein the spring constant of said constraining means is less than the spring constant of said wires.

36. A transducer according to claim 34, wherein the spring constant of said constraining means is from about .01 times to zero times the spring rate of the wires.

37. A transducer according to claim 34, wherein the spring rate of the constraining means is from 0.001 to 0.01 times the spring rate of the wires.

No references cited.